US012712950B2

(12) United States Patent
Zheng et al.

(10) Patent No.: US 12,712,950 B2
(45) Date of Patent: Aug. 18, 2026

(54) METHOD FOR PROCESSING PACKET AND APPARATUS

(71) Applicant: Huawei Technologies Co., Ltd., Shenzhen (CN)

(72) Inventors: Hewen Zheng, Nanjing (CN); Xiaojun Zhang, Shenzhen (CN); Lei Han, Nanjing (CN); Xiaofei Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 524 days.

(21) Appl. No.: 18/161,460

(22) Filed: Jan. 30, 2023

(65) Prior Publication Data

US 2023/0247118 A1 Aug. 3, 2023

Related U.S. Application Data

(63) Continuation of application No. PCT/CN2021/104438, filed on Jul. 5, 2021.

(30) Foreign Application Priority Data

Jul. 28, 2020 (CN) ........................ 202010739782.6

(51) Int. Cl.
*H04L 69/22* (2022.01)
*H04L 69/167* (2022.01)
*H04L 69/324* (2022.01)

(52) U.S. Cl.
CPC .................................... *H04L 69/22* (2013.01)

(58) Field of Classification Search
CPC ......... H04L 69/22; H04L 67/60; H04L 69/06; H04L 69/322
See application file for complete search history.

(56) References Cited

U.S. PATENT DOCUMENTS

| | | | | |
|---|---|---|---|---|
| 9,154,327 | B1 * | 10/2015 | Marino | H04L 69/22 |
| 10,911,579 | B1 * | 2/2021 | Volpe | H04L 47/2483 |
| 11,202,230 | B2 * | 12/2021 | Rácz | H04W 76/16 |

(Continued)

FOREIGN PATENT DOCUMENTS

| | | |
|---|---|---|
| CN | 107810621 A | 3/2018 |
| CN | 108370450 A | 8/2018 |

(Continued)

OTHER PUBLICATIONS

RFC 2507, M. Degermark, et al, "IP Header Compression," Feb. 1999, 47 pages.

(Continued)

*Primary Examiner* — Schquita D Goodwin
(74) *Attorney, Agent, or Firm* — Conley Rose, P.C.

(57) ABSTRACT

A method implemented by a communication apparatus for processing a packet. The method includes obtaining, by the communication apparatus, a first packet, where the first packet includes a first-layer header. The first-layer header includes an identification field used to identify whether the first-layer header of the first packet includes information in a second-layer header. The communication apparatus then processes the first packet, which may include sending the first packet, forwarding the first packet, scheduling or marking the first packet, or the like.

20 Claims, 16 Drawing Sheets

(56) References Cited

U.S. PATENT DOCUMENTS

| | | | | |
|---|---|---|---|---|
| 11,343,358 | B2 * | 5/2022 | Peled | H04L 47/2441 |
| 11,782,868 | B2 * | 10/2023 | Cherian | H04L 41/122 709/212 |
| 2008/0002976 | A1 | 1/2008 | Tal et al. | |
| 2010/0202451 | A1 | 8/2010 | Glover et al. | |
| 2016/0315681 | A1 * | 10/2016 | Moon | H04W 74/0816 |
| 2017/0005925 | A1 | 1/2017 | Yang et al. | |
| 2018/0270146 | A1 * | 9/2018 | Jiang | H04L 45/16 |
| 2018/0359507 | A1 | 12/2018 | Oh et al. | |
| 2019/0288944 | A1 | 9/2019 | Yang et al. | |
| 2020/0021532 | A1 * | 1/2020 | Borikar | H04L 49/90 |
| 2020/0059976 | A1 * | 2/2020 | Bhatia | H04W 8/005 |
| 2020/0186624 | A1 * | 6/2020 | Kwon | H04N 21/242 |
| 2021/0014340 | A1 * | 1/2021 | Weber | H04L 69/22 |
| 2021/0226879 | A1 * | 7/2021 | Indiresan | H04L 43/10 |

FOREIGN PATENT DOCUMENTS

| | | | | |
|---|---|---|---|---|
| CN | 110445703 B | * | 5/2021 | H04L 12/4641 |
| CN | 115086256 A | | 9/2022 | |
| CN | 115134039 A | | 9/2022 | |
| CN | 115529106 A | | 12/2022 | |

OTHER PUBLICATIONS

RFC 3843, L-E.Jonsson et al, "RObust Header Compression (ROHC): A Compression Profile for IP," Jun. 2004, 16 pages.

RFC 5795, K. Sandlund, et al, "The RObust Header Compression (ROHC) Framework," Mar. 2010, 41 pages.

RFC 3095, C.Bormann, et al, "RObust Header Compression (ROHC): Framework and four profiles: RTP, UDP, ESP, and uncompressed," Jul. 2001, 168 pages.

RFC 3544, T.Koren, et al,"IP Header Compression over PPP," Jul. 2003, 14 pages.

RFC 4815, L-E.Jonsson et al, "RObust Header Compression (ROHC): Corrections and Clarifications to RFC 3095," Feb. 2007, 33 pages.

RFC 6846, G. Pelletier, et al, "RObust Header Compression (Rohc): A Profile for TCP/IP (ROHC-TCP)," Jan. 2013, 96 pages.

RFC 5225, G.Pelletier, et al, "RObust Header Compression Version 2 (ROHCv2): Profiles for RTP, UDP, IP, ESP and UDP-Lite" Apr. 2008, 124 pages.

RFC 2509, M. Engan, et al, "IP Header Compression over PPP," Feb. 1999, 10 pages.

"Jumbo Frames and INTERNET2," Internet2 Network NOC, Apr. 1, 2003, 10 pages.

"Mrsum-almes-mtu," Internet2 Network NOC, Feb. 17, 2003, 1 pages.

Tom Herbert et al,"Identifier-locator addressing for IPV6," draft-herbert-intarea-ila-00, Oct. 19, 2017, 90 pages.

Ignacio Laguna, et al, "A Large-Scale Study of MPI Usage in Open-Source HPC Applications," Oct. 16, 2019, 14 pages.

Philip A. Taffet, et al, "Exploring Application Performance on Fat-Tree Networks in the Presence of Congestion," Aug. 8, 2018, 3 pages.

Kevin A. Brown, et al, "Interference between I/O and MPI Traffic on Fat-tree Networks," Dec. 23, 2018, 10 pages.

Sudheer Chunduri, et al, "Characterization of MPI Usage on a Production Supercomputer," Sep. 1, 2018, 15 pages.

Steve Scott, "Rosetta : A 64-port Switch for Cray"s Slingshot Interconnect," Aug. 16, 2019, 37 pages.

Chuanxiong Guo, et al., "RDMA over Commodity Ethernet at Scale," Aug. 2016, 14 pages.

Wikipedia, "Jumbo frame," Feb. 4, 2006, 5 pages.

Wikipedia, "EtherType," Nov. 9, 2002, 4 pages.

IBTA "Supplement to InfiniBand Architecture Specification vol. 1, Release 1.2.1," Annex A17:RoCEv2, Sep. 2, 2014, 23 pages.

IBTA "InfiniBand Architecture Specification, vol. 1, Release 1.3, Mar. 3, 2015," 1842 pages.

David Schor, "Inside Rosetta: The Engine Behind Cray's Slingshot Exascale-Era Interconnect," Feb. 9, 2020, 14 pages.

Postel, J., "User Datagram Protocol," RFC 768, Aug. 28, 1980, 3 pages.

"Darpa Internet Program," Protocol Specification, RFC 791, Sep. 1981, 51 pages.

ANSI X3S3.3 86-80, "Final Test of Dis 8473, Protocol for Providing the Connectionlessmode Network Service," Mar. 1986, 52 pages.

Braden, R., "Requirements for Internet Hosts—Communication Layers," RFC 1122, Oct. 1989, 116 pages.

Braden, R., "Requirements for Internet Hosts—Application and Support," RFC 1123, Oct. 1989, 98 pages.

Rosen, E., et al., "Multiprotocol Label Switching Architecture," RFC 3031, Jan. 2001, 61 pages.

IEEE Std 802.3ad-2000, Amendment to Carrier Sense Multiple Access with Collision Detection (CSMA/CD) Access Method and Physical Layer Specifications—Aggregation of Multiple Link Segments, Approved Mar. 30, 2000, total 183 pages.

David C. Plummer, RFC 826, An Ethernet Address Resolution Protocol, Nov. 1982, 10 pages.

* cited by examiner

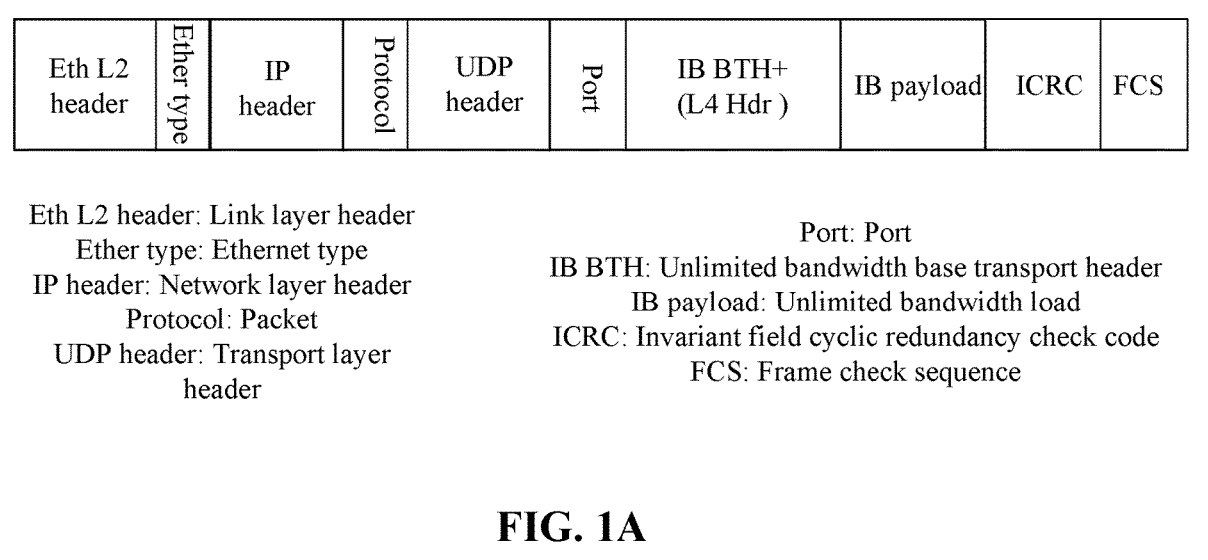

| Eth L2 header | Ether type | IP header | Protocol | UDP header | Port | IB BTH+ (L4 Hdr ) | IB payload | ICRC | FCS |
|---|---|---|---|---|---|---|---|---|---|

Eth L2 header: Link layer header
Ether type: Ethernet type
IP header: Network layer header
Protocol: Packet
UDP header: Transport layer header Port: Port
IB BTH: Unlimited bandwidth base transport header
IB payload: Unlimited bandwidth load
ICRC: Invariant field cyclic redundancy check code
FCS: Frame check sequence

FIG. 1A

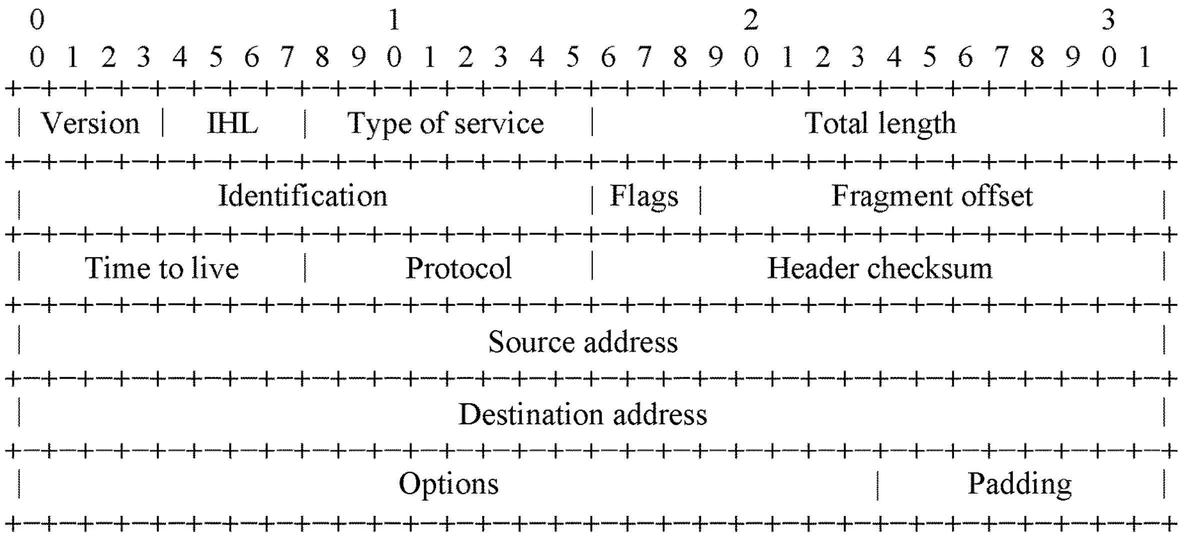

Version: Version
IHL: IP header length
Type of service: Type of service
Total length: Total length
Identification: Identification
Flags: Flags
Fragment offset: Fragment offset
Time to live: Time to live
Protocol: Protocol
Header checksum: Header checksum
Source address: Source IP address Destination address: Destination IP address
Options: Options
Padding: Padding

FIG. 1B

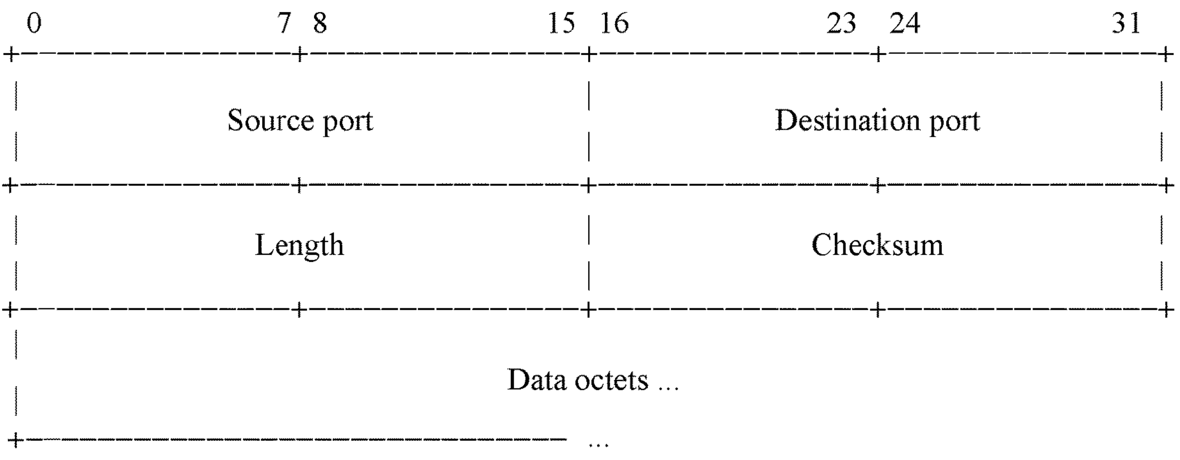

Source port: Source port
Destination port: Destination port
Length: Length
Checksum: Checksum
Data octets: Data octets

FIG. 1C

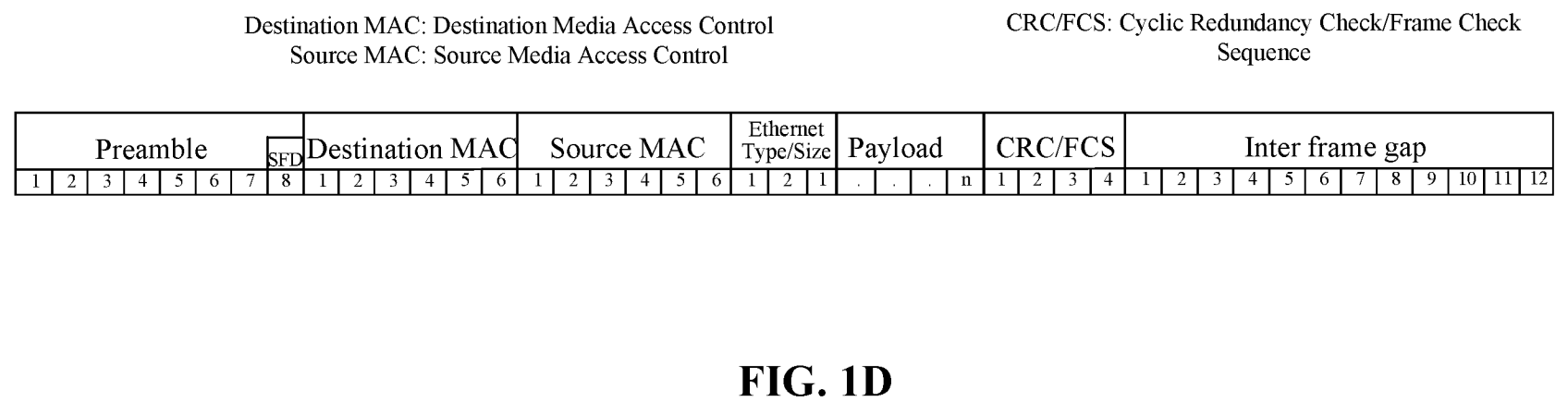

Destination MAC: Destination Media Access Control
Source MAC: Source Media Access Control CRC/FCS: Cyclic Redundancy Check/Frame Check Sequence

| Preamble | SFD | Destination MAC | Source MAC | Ethernet Type/Size | Payload | CRC/FCS | Inter frame gap |
|---|---|---|---|---|---|---|---|
| 1 2 3 4 5 6 7 | 8 | 1 2 3 4 5 6 | 1 2 3 4 5 6 | 1 2 | 1 . . . n | 1 2 3 4 | 1 2 3 4 5 6 7 8 9 10 11 12 |

FIG. 1D

FCS: Frame check sequence
Message: Message
BTH: Base transport header
IPv4/v6: Internet protocol version 4/6
Ethernet link layer: Ethernet link layer
Ethernet physical layer: Ethernet physical layer FCS: Frame check sequence
Message: Message
BTH: Base transport header
IPv4/v6: Internet protocol version 4/6
Ethernet link layer: Ethernet link layer
Ethernet physical layer: Ethernet physical layer DSCP: Differentiated service code point
ECN: Explicit congestion notification

METHOD FOR PROCESSING PACKET AND APPARATUS

CROSS-REFERENCE TO RELATED APPLICATIONS

This application is a continuation of International Patent Application No. PCT/CN2021/104438, filed on Jul. 5, 2021, which claims priority to Chinese Patent Application No. 202010739782.6, filed on Jul. 28, 2020. The disclosures of the aforementioned applications are hereby incorporated by reference in their entireties.

TECHNICAL FIELD

This disclosure relates to the field of communication technologies, and in particular, to a method for processing a packet and an apparatus.

BACKGROUND

Generally, after obtaining a packet, a communication apparatus may obtain information about a link layer from a link layer header of the packet, obtain information about a network layer from a network layer header of the packet, and obtain information about a transport layer from a transport layer header of the packet.

In other words, the communication apparatus obtains information about corresponding layers from different layer headers. However, the method for obtaining information is not flexible enough.

SUMMARY

This disclosure provides a method and an apparatus for processing a packet to improve flexibility in obtaining information by a communication apparatus.

According to a first aspect, an embodiment of this disclosure provides a method for processing a packet. The method includes obtaining a first packet, where the first packet includes a first-layer header, the first-layer header includes an identification field, and the identification field is used to identify whether the first-layer header of the first packet includes information in a second-layer header; and processing the first packet.

In this embodiment of this disclosure, the communication apparatus may be configured to perform the method for processing a packet provided in this disclosure. The communication apparatus may include a transmit end and a receive end. The transmit end may be understood as an apparatus for sending the first packet, and the receive end may understand as an apparatus for receiving the first packet. Optionally, the communication apparatus may further include an intermediate node between the transmit end and the receive end. Therefore, a manner of obtaining the first packet and a method for processing the first packet vary depending on different communication apparatuses. Optionally, for the transmit end, the obtaining a first packet includes generating the first packet, and the processing the first packet includes sending the first packet. Optionally, for the receive end, the obtaining a first packet includes receiving the first packet, and the processing the first packet includes determining an application process and the like based on information in the first-layer header of the first packet. Optionally, for the intermediate node, the obtaining a first packet includes receiving the first packet, and the processing the first packet includes forwarding the first packet based on the information in the first-layer header of the first packet, or includes scheduling or marking the first packet and the like based on the information in the first-layer header of the first packet.

In this embodiment of this disclosure, the first-layer header includes the information in the second-layer header, so that the communication apparatus can directly obtain corresponding information from the first-layer header, to process the first packet, making a manner of obtaining information by the communication apparatus more flexible. In addition, the communication apparatus can directly obtain the information in the second-layer header from the first-layer header, which avoids obtaining the information in the second-layer header from the second-layer header, thereby improving efficiency of the communication apparatus in obtaining information.

In a possible implementation, the first packet does not include the second-layer header.

In this embodiment of this disclosure, the communication apparatus may selectively retain key information in the second-layer header, and in addition, selectively delete non-key information from the first-layer header. Therefore, fields in the first-layer header may be used to carry the key information in the second-layer header. The key information is retained, to achieve compatibility with an ethernet technology, while reducing overheads of the first packet. Moreover, the first packet does not include the second-layer header, which can further reduce overheads of the first packet, thereby improving transmission efficiency of the first packet.

In a possible implementation, the first-layer header and the second-layer header belong to different layer headers in a Transmission Control Protocol/Internet Protocol (TCP/IP) or Open System Interconnection (OSI) layer model.

In a possible implementation, the first-layer header includes any one or more of a link layer header, a network layer header, or a transport layer header; and the second-layer header includes one or more of the link layer header, the network layer header, or the transport layer header, and the second-layer header is different from the first-layer header.

In this embodiment of this disclosure, for example, the first-layer header includes the link layer header, and the second-layer header includes the network layer header and/or the transport layer header. Alternatively, the first-layer header includes the network layer header, and the second-layer header includes the transport layer header.

In a possible implementation, a protocol of a link layer includes any one of an ethernet protocol, a wireless fidelity (WIFI) protocol, or a point-to-point protocol (PPP). A protocol of a network layer includes any one of an IP version 4 (IPv4) or IP version 6 (IPv6), an Address Resolution Protocol (ARP), or a multi-protocol label switching (MPLS) protocol. A protocol of a transport layer includes any one of a TCP, a User Datagram Protocol (UDP), a generic routing encapsulation (GRE) protocol, a Datagram Congestion Control Protocol (DCCP), or a Stream Control Transmission Protocol (STCP).

In a possible implementation, when the identification field carries a first identifier, the first-layer header of the first packet includes the information in the second-layer header. When the identification field carries a second identifier, the first-layer header of the first packet does not include the information in the second-layer header.

In this embodiment of this disclosure, the identification field may carry the second identifier.

In a possible implementation, the first-layer header includes the link layer header, and the second-layer header includes the network layer header and/or the transport layer header.

In a possible implementation, when the identification field carries the first identifier, the link layer header includes any one or more of source IP address information, destination IP address information, or source port information. The source IP address information and the destination IP address information belong to information in the network layer header, and the source port information belongs to information in the transport layer header.

In a possible implementation, the link layer header further includes type of service (TOS) information, and the TOS information belongs to the information in the network layer header.

In a possible implementation, the processing the first packet includes sending the first packet.

In this embodiment of this disclosure, the first packet may be sent by the transmit end.

In a possible implementation, before the obtaining a first packet, the method further includes obtaining a second packet, where the second packet includes a network layer header and/or a transport layer header; and the obtaining a first packet includes generating the first packet based on the second packet, where the link layer header of the first packet includes information in the network layer header and/or the transport layer header of the second packet, and the first packet does not include the network layer header and/or the transport layer header.

In a possible implementation, a payload corresponding to the link layer header of the first packet is the same as a payload corresponding to the transport layer header of the second packet.

In this embodiment of this disclosure, in the first packet generated by the communication apparatus, such as the transmit end, based on the second packet, the payload corresponding to the link layer header of the first packet may be the same as the payload of the transport layer header of the second packet. In other words, payload data of the first packet generated by the communication apparatus may be the same as payload data of the second packet. Therefore, in a case in which the same payload data is ensured, the first packet does not include the transport layer header and/or the network layer header, and key information in the transport layer header and/or the network layer header may be further retained in the first packet, which not only reduces overheads of the first packet and improves transmission efficiency of the first packet, but also can achieve compatibility with ethernet or IP forwarding or the like.

In a possible implementation, the generating the first packet based on the second packet includes generating, when a length of the second packet is less than or equal to a length threshold, and/or when a destination port field in the transport layer header of the second packet carries a preset port identifier (such as 4791), the first packet based on the second packet.

In a possible implementation, the processing the first packet includes forwarding the first packet based on the destination IP address information included in the link layer header; and/or scheduling the first packet to a corresponding queue based on the TOS information included in the link layer header.

In this embodiment of this disclosure, the first packet may be forwarded or scheduled by the intermediate node.

In a possible implementation, when a queue depth of the corresponding queue is greater than or equal to a depth threshold, the TOS information includes marked explicit congestion notification (ECN) information.

In this embodiment of this disclosure, when the intermediate node schedules the first packet to the corresponding queue based on the TOS information in the link layer header, the intermediate node may perform ECN marking on the TOS information if the queue depth of the corresponding queue is greater than or equal to the depth threshold.

In a possible implementation, the processing the first packet includes determining an application process based on the source IP address information, the destination IP address information, and the source port information in the link layer header, where the application process is used to process the first packet.

In this embodiment of this disclosure, the receive end may form a session identifier based on the source IP address information, the destination IP address information, and the source port information in the link layer header, and then determine a corresponding application process based on the session identifier. That is, the receive end may form the session identifier based on related information in the link layer header, and determine the corresponding application process, where the determined application process may be used to process the first packet.

According to a second aspect, this disclosure provides a communication apparatus configured to perform the method according to the first aspect or any possible implementation of the first aspect. The communication apparatus includes corresponding units for performing the method in the first aspect or any possible implementation of the first aspect.

For example, the communication apparatus may include a transceiver unit and a processing unit.

In some embodiments of this disclosure, the processing unit is configured to generate a first packet, and the transceiver unit is configured to output the first packet.

In some other embodiments of this disclosure, the transceiver unit is configured to obtain the first packet, the processing unit is configured to schedule the first packet, and the transceiver unit may be further configured to output the first packet.

In still some other embodiments of this disclosure, the transceiver unit is configured to obtain the first packet, and the processing unit is configured to determine an disclosure process based on the first packet.

According to a third aspect, this disclosure provides a communication apparatus. The communication apparatus includes a processor configured to execute a program stored in a memory. When the program is executed, the communication apparatus is enabled to perform the method according to the first aspect or any possible implementation of the first aspect.

In a possible implementation, the memory is located outside the communication apparatus.

In a possible implementation, the memory is located in the communication apparatus.

In this embodiment of this disclosure, the memory and the processor may alternatively be integrated together.

In a possible implementation, the communication apparatus further includes a transceiver, where the transceiver is configured to transmit data, signaling, and/or the like.

In this embodiment of this disclosure, the processor may be configured to obtain a first packet, and the processor may be further configured to process the first packet.

That the processor is configured to obtain a first packet, as illustrated herein, may be understood as the processor is configured to generate the first packet, or the processor may be configured to obtain the first packet through the transceiver.

That the processor is configured to process the first packet, as illustrated herein, may be understood as the processor may be configured to output the first packet through the transceiver. Alternatively, the processor may be configured to schedule the first packet. Alternatively, the processor may be configured to determine an application process and the like based on the first packet.

For specific implementation of the processor and/or the transceiver, refer to description in the apparatus embodiments below. Details are not described herein again.

According to a fourth aspect, this disclosure provides a communication apparatus, where the communication apparatus includes a logic circuit and an interface.

In some embodiments of this disclosure, the logic circuit may be configured to generate a first packet, and the interface is configured to output the first packet.

In some other embodiments of this disclosure, the interface unit is configured to obtain (or referred to as "input") the first packet, the logic circuit is configured to schedule the first packet, and the interface may be further configured to output the first packet.

In still some other embodiments of this disclosure, the interface is configured to obtain the first packet, and the logic circuit is configured to determine an application process based on the first packet.

According to a fifth aspect, this disclosure provides a computer-readable storage medium. The computer-readable storage medium is configured to store a computer program, and when the computer program is run on a computer, the method according to the first aspect or any possible implementation of the first aspect is performed.

According to a sixth aspect, this disclosure provides a computer program product. The computer program product includes a computer program or computer code, and when the computer program or computer code is run on a computer, the method according to the first aspect or any possible implementation of the first aspect is performed.

According to a seventh aspect, this disclosure provides a computer program, and when the computer program is run on a computer, the method according to the first aspect or any possible implementation of the first aspect is performed.

According to an eighth aspect, this disclosure provides a communication system for processing a packet. The communication system includes a transmit end and a receive end. The transmit end may be configured to obtain a first packet, and send the first packet to the receive end. The receive end may be configured to obtain the first packet, form a session identifier based on the first packet, and determine a corresponding application process based on the session identifier.

In a possible implementation, the communication system may further include an intermediate node, and the intermediate node may be configured to forward the first packet; or schedule the first packet; or mark the first packet; and so on.

BRIEF DESCRIPTION OF DRAWINGS

FIG. 1A is a schematic diagram of a packet format under the RoCEv2 specification according to an embodiment of this disclosure;

FIG. 1B is a schematic diagram of information in a network layer header according to an embodiment of this disclosure;

FIG. 1C is a schematic diagram of information in a transport layer header according to an embodiment of this disclosure;

FIG. 1D is a schematic diagram of a packet format under the RoCEv2 specification according to an embodiment of this disclosure;

DESCRIPTION OF EMBODIMENTS

Figure 2:
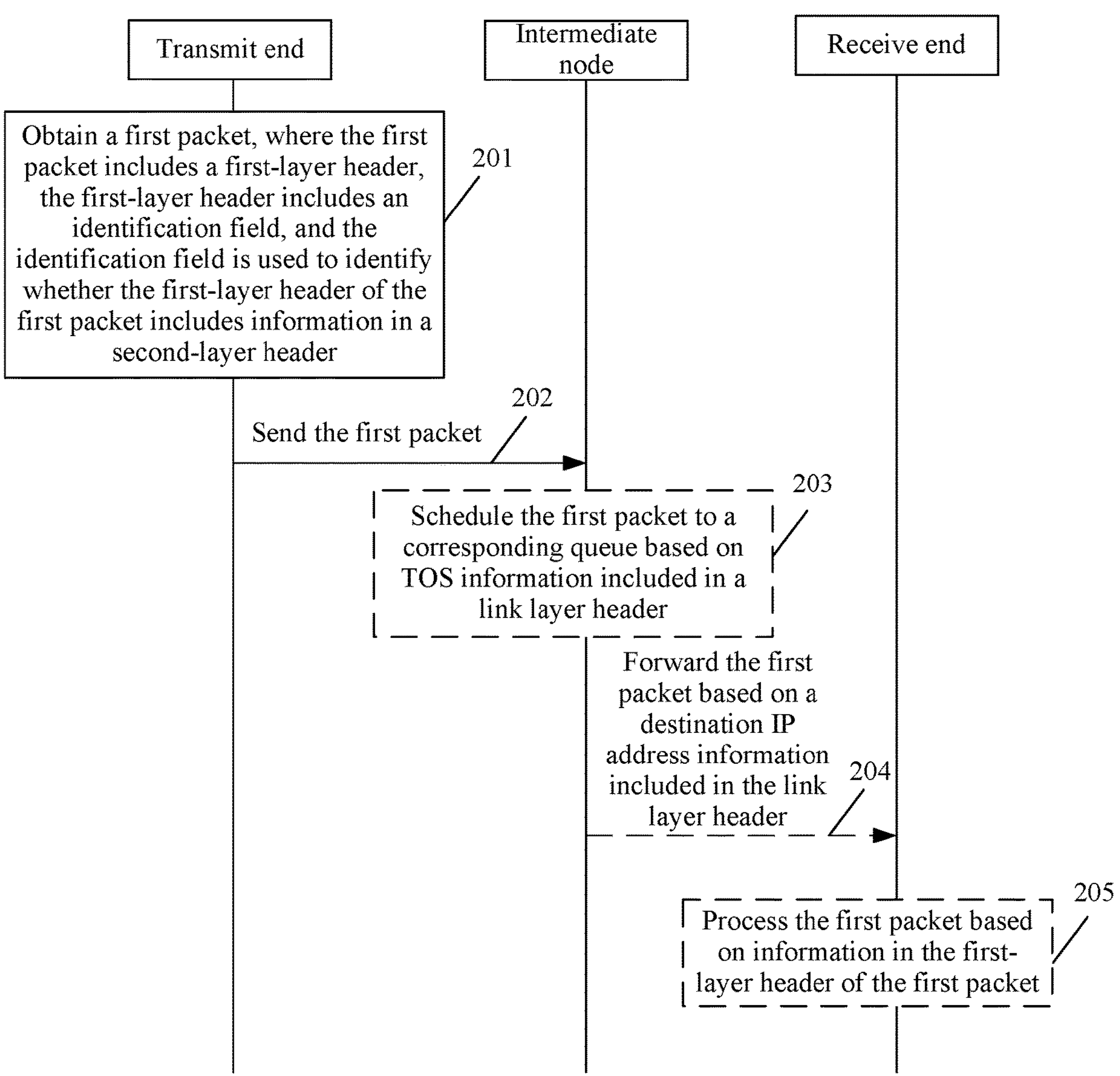
FIG. 2 is a schematic flowchart of a method for processing a packet according to an embodiment of this disclosure.

To make objectives, technical solutions, and advantages of this disclosure clearer, the following further describes this disclosure in detail with reference to the accompanying drawings.

In the specification, claims, and accompanying drawings of this disclosure, the foregoing terms "first", "second", and so on are intended to distinguish between different objects but do not indicate a particular order. In addition, terms "include", "have", and any other variant thereof are intended to cover non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device.

Mentioning an "embodiment" in the specification means that a particular characteristic, structure, or feature described with reference to the embodiment may be included in at least one embodiment of this disclosure. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this disclosure, "at least one" means one or more, "a plurality of" means two or more, "at least two" means two or three or more, and "and/or" is an association relationship describing associated objects, and indicates that three relationships may exist. For example, A and/or B may indicate that only A exists, only B exists, or both A and B exist. A and B each may be singular or plural. The character "/" usually indicates an "or" relationship between associated objects. "At least one of the following items" or a similar expression means any combination of these items. For example, at least one of a, b, or c may represent a or b or c; a and b; a and c; b and c; or a, b, and c.

The terms related in this disclosure are described below in detail.

1. TCP/IP: means a protocol stack that can achieve information transmission between a plurality of different networks. TCP/IP not only means the two protocols of TCP and IP, but means a protocol stack including protocols such as a File Transfer Protocol (FTP), a Simple Mail Transfer Protocol (SMTP), the TCP, a UDP, and the IP. A TCP/IP reference model may include a link layer, a network layer, a transport layer, and an application layer.

For example, FIG. 1A shows a packet format under the remote direct memory access (RDMA) over converged Ethernet (RoCE) version 2 specification. In the packet format conforming to the RoCEv2 specification (referred to as a RoCEv2 packet below), RDMA may be understood as the application layer, the UDP may be understood as the transport layer, the IP may be understood as the network layer, and an Ethernet may be understood as the link layer. As shown in FIG. 1A, the RoCEv2 packet includes a link layer header, as shown by the Eth L2 header in FIG. 1A; a network layer header, as shown by the IP header in FIG. 1A; a transport layer header, as shown by the UDP header in FIG. 1A; and a payload, as shown by the InfiniBand (IB) base transport header (BTH) and the IB payload in FIG. 1A. The payload illustrated herein may also be understood as payload data, or the IB payload may also be understood as payload data, which is not limited in this disclosure.

Further, the link layer header may include a 6-byte destination media access control (MAC) address field, a 6-byte source MAC address field, and a 2-byte ethernet type field. The frame check sequence (FCS) field shown in FIG. 1A also belongs to the link layer; however, the FCS field is not included in the link layer header, and a length of the FCS is 4 bytes. FIG. 1B shows fields included in the network layer header, and the network layer header may include 20 bytes. As shown in FIG. 1B, the network layer header includes a version field, an IP header length (IHL) field, a type of service field, a total length field, an identification field, a flags field, a fragment offset field, a time to live field, a protocol field, a header checksum field, a source IP address field, a destination IP address field, an options field, and a padding field. FIG. 1C shows fields included in the transport layer header, and the transport layer header may include 8 bytes. As shown in FIG. 1C, the transport layer header includes a source port field, a destination port field, a length field, a checksum field, and a payload (data octets) field of a UDP transport layer (or referred to as a payload field corresponding to a UDP transport layer header). The payload may include a 12-byte BTH and a 2-byte message. It may be understood that the content shown in FIG. 1B and FIG. 1C may be understood as content in a payload in FIG. 1D, namely, a payload corresponding to the link layer header.

It may be understood that only one type of packet format is shown above, and in specific implementation, another packet format using the TCP/IP as a reference model may also be included, for example, an internet wide area RDMA protocol (iWARP). Details are not described herein in this disclosure. The structure shown in FIG. 1A to FIG. 1D is merely an example, and the TCP/IP complies with model layering of the International Organization for Standardization (ISO) and/or Internet Engineering Task Force (IETF) standards. A specific encapsulation level of the TCP/IP, positions of different fields in the packet format, and/or the like may vary with a specific protocol, which is not limited in this disclosure.

2. OSI is an open communication system interconnection reference model. A hierarchical architecture of the OSI model may include seven layers a physical layer, a data link layer, a network layer, a transport layer, a session layer, a presentation layer, and an application layer. It may be understood that for a specific encapsulation level and/or packet format of the OSI reference model, reference may be made to related standards or protocols or the like. Details are not described herein.

It may be understood that the TCP/IP and the OSI are merely two reference models illustrated in this disclosure. For another reference model, reference may be further made to Request for Comments (RFC) 994, RFC 1122, RFC 1123, RFC 3031, or the like, which is not limited in this disclosure.

3. First-layer header and second-layer header may be understood as different encapsulation levels belonging to a same reference model; or different layer headers belonging to a same reference model; or may be understood as that the second-layer header belongs to a part or all of a payload of the first-layer header.

In some implementations of this disclosure, in the TCP/IP reference model, the RoCEv2 packet is used as an example, the first-layer header is a link layer header (including an Ethernet layer header), and the second-layer header is a transport layer header and/or a network layer header. In other implementations of this disclosure, in the TCP/IP reference model, the RoCEv2 packet is used as an example, the first-layer header is a network layer header, and the second-layer header is a transport layer header. In the TCP/IP reference model, the iWARP is used as an example, the first-layer header is a link layer header, and the second-layer header is a network layer header.

In this disclosure, a protocol of the link layer may include any one of an ethernet protocol, a WiFi protocol, or a PPP. A protocol of the network layer may include any one of IPv4, IPv6, an ARP, or a MPLS protocol. A protocol of the transport layer may include any one of the TCP, the UDP, a GRE protocol, a DCCP, or a STCP.

It may be understood that the foregoing illustrated protocols of the link layer, the network layer, and the transport layer are merely examples, and in specific implementation, may further include other protocols and the like, which are not limited in this disclosure. In addition, a protocol corresponding to the first-layer header and/or the second-layer header is not limited either in this disclosure.

4. First packet may also be understood as a compacted packet or the like. A name of the first packet is not limited in this disclosure. In this disclosure, a first-layer header of the first packet may include information in the second-layer header. Optionally, the first packet may not include the second-layer header.

In different packet formats, after obtaining a packet, a communication apparatus generally needs to read corresponding information from different levels, resulting in an inflexible manner of obtaining information and low efficiency in obtaining information. In addition, under the protocol specification shown in FIG. 1A, when the communication apparatus transmits a RoCEv2 packet, a standard of an Ethernet requires a minimum frame size (minframe size) of 64 bytes. The 64 bytes start with a Pt byte of the Ethernet layer and ends with a last byte of an FCS. If there are less than 64 bytes, padding to 64 bytes is required. Therefore, if only an 8-byte message is transmitted, a 64-byte Ethernet frame still needs to be used. In this case, transmission efficiency is 12.5%. The transmission efficiency illustrated in this disclosure may be understood as a proportion of an effective length of content in a total length of the packet. The content (or message) may be understood as the IB payload shown in FIG. 1A, or the message shown in FIG. 3A.

In view of this, this disclosure provides a method for processing a packet and an apparatus, which can improve flexibility in obtaining information, while improving efficiency in obtaining information and efficiency in transmitting a packet. The method provided in this disclosure may be applied to an ethernet, a data center network, campus networking, a high-performance computing cluster, an Internet of things (IoT), and the like, which is not limited in this disclosure. The communication apparatus may be configured to perform the method provided in this disclosure. The communication apparatus may be a server, an access device (such as a next generation base station (gNB) or a base station on a fifth-generation (5G) or sixth-generation (6G) network), a switch (or referred to as a switching device, a switching chip, or the like), a router, a network adapter, or the like. A specific form of the communication apparatus is not limited in this disclosure.

Optionally, the method for processing a packet provided in this disclosure may be applied to at least two communication apparatuses, for example, the at least two communication apparatuses may include a transmit end and a receive end. Optionally, an intermediate node may be further included between the transmit end and the receive end, and the intermediate node may include a switch or a router or the like. For example, both the transmit end and the receive end may be servers, or may be access devices. For another example, the transmit end may be understood as a source end (including a switch, a router, a network adapter, or the like), and the receive end may be understood as a destination end (including a switch, a router, a network adapter, or the like). It may be understood that specific product forms of the transmit end, the receive end, and the intermediate node are not limited in this disclosure.

The following uses the transmit end and the receive end as an example to illustrate a method for processing a packet provided in an embodiment of this disclosure. The transmit end may be understood as an apparatus for sending the first packet, or the transmit end may be understood as an apparatus for generating the first packet. The receive end may be understood as an apparatus for receiving the first packet. As shown in FIG. 2, the method includes the following steps.

201. The transmit end obtains a first packet, where the first packet includes a first-layer header, the first-layer header includes an identification field, and the identification field is used to identify whether the first-layer header of the first packet includes information in a second-layer header.

In some implementations, the first packet may include the second-layer header, and when the first-layer header of the first packet includes the information in the second-layer header, after receiving the first packet, the receive end or an intermediate node may read information in the first-layer header and the information in the second-layer header based on the first-layer header of the first packet, without a need to read the information from the second-layer header. In some other implementations, the first packet may not include the second-layer header, and when the first-layer header of the first packet includes the information in the second-layer header, overheads of the first packet can be reduced.

The identification field is used to identify whether the first-layer header of the first packet includes the information in the second-layer header. In other words, information carried in the identification field may be used to indicate whether the first-layer header of the first packet includes the information in the second-layer header. For example, when the identification field carries a first identifier, the first-layer header of the first packet includes the information in the second-layer header. For example, when the identification field carries a second identifier, the first-layer header of the first packet does not include the information in the second-layer header. For example, a length of the identification field may be 1 bit, 2 bits, 3 bits, 1 byte, or the like. The length of the identification field may be set according to different standards or specification protocols, which is not limited in this embodiment of this disclosure. It may be understood that specific values of the first identifier and the second identifier are not limited in this embodiment of this disclosure.

Figure 3A:
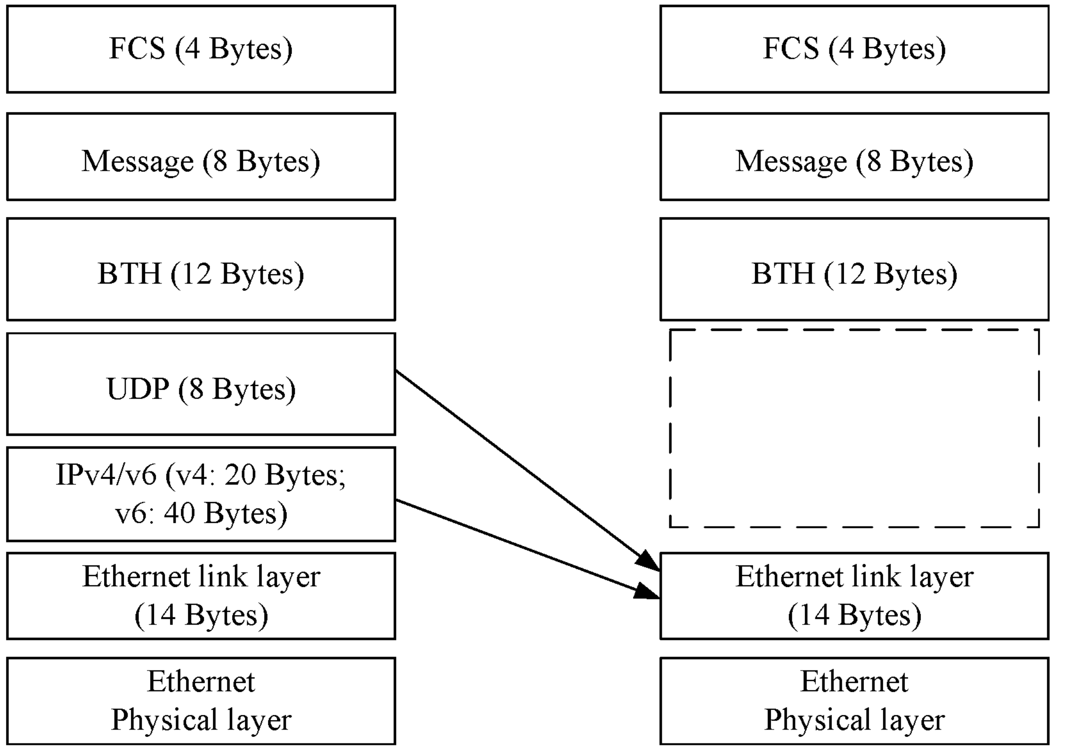
FIG. 3A is a schematic diagram of a packet format comparison according to an embodiment of this disclosure.
Figure 3B:
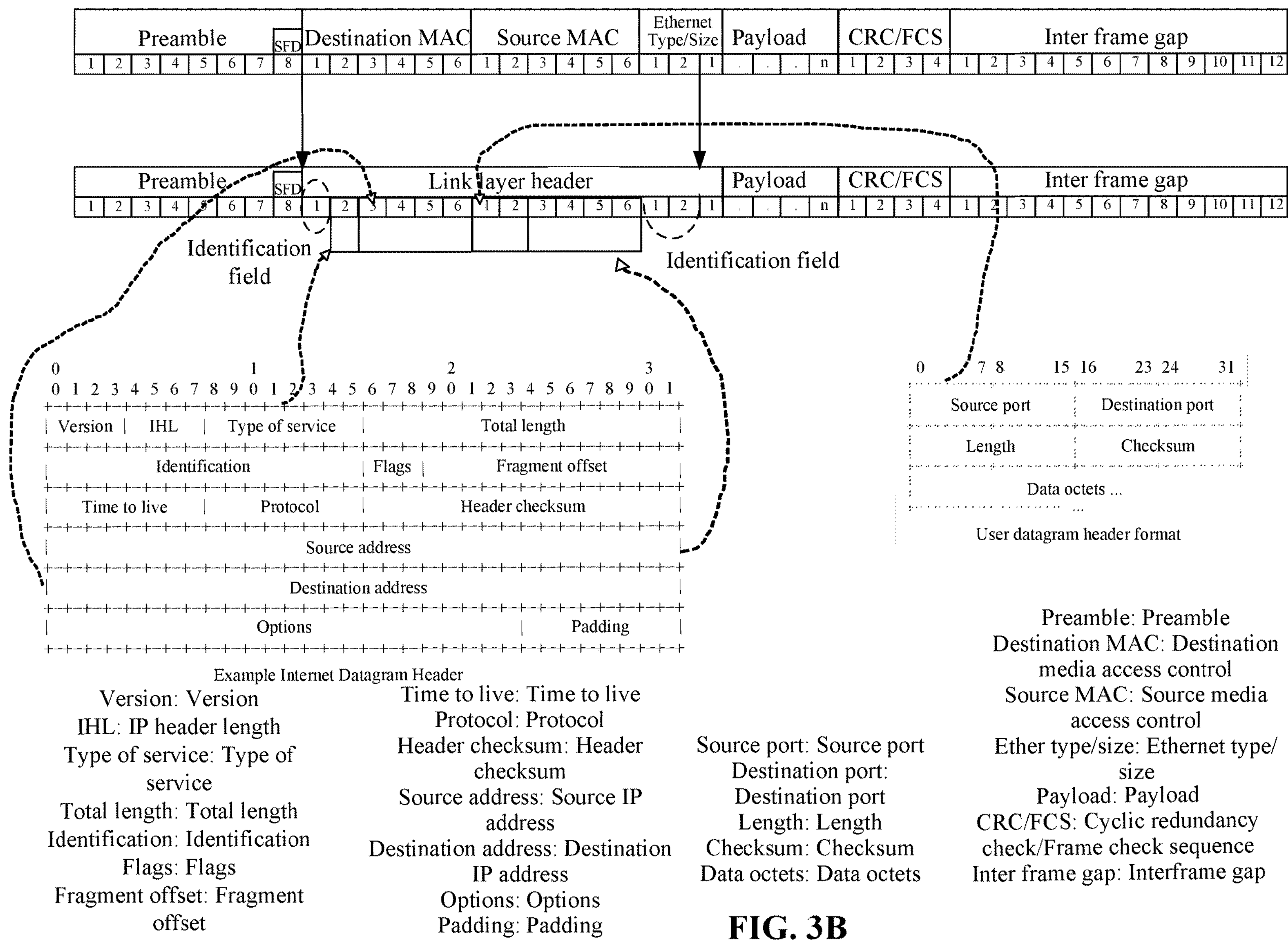
FIG. 3B is a schematic diagram of a packet format comparison in another form according to an embodiment of this disclosure.
Figure 3C:
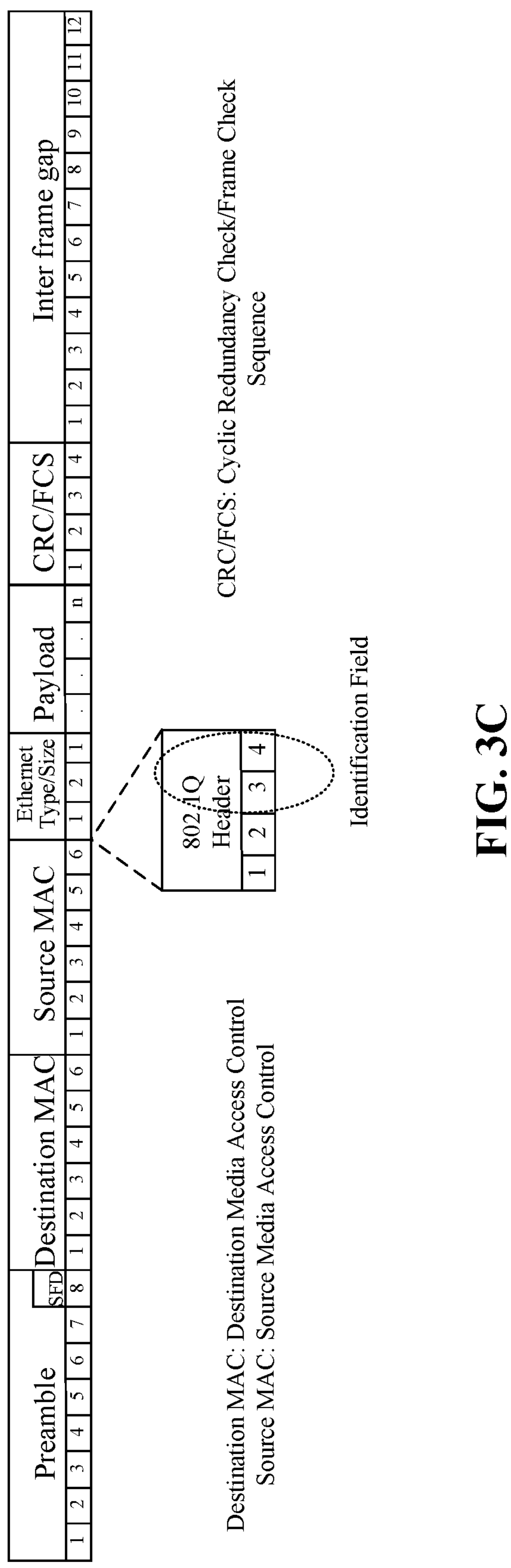
FIG. 3C is a schematic diagram of a packet format according to an embodiment of this disclosure.
Figure 4A:
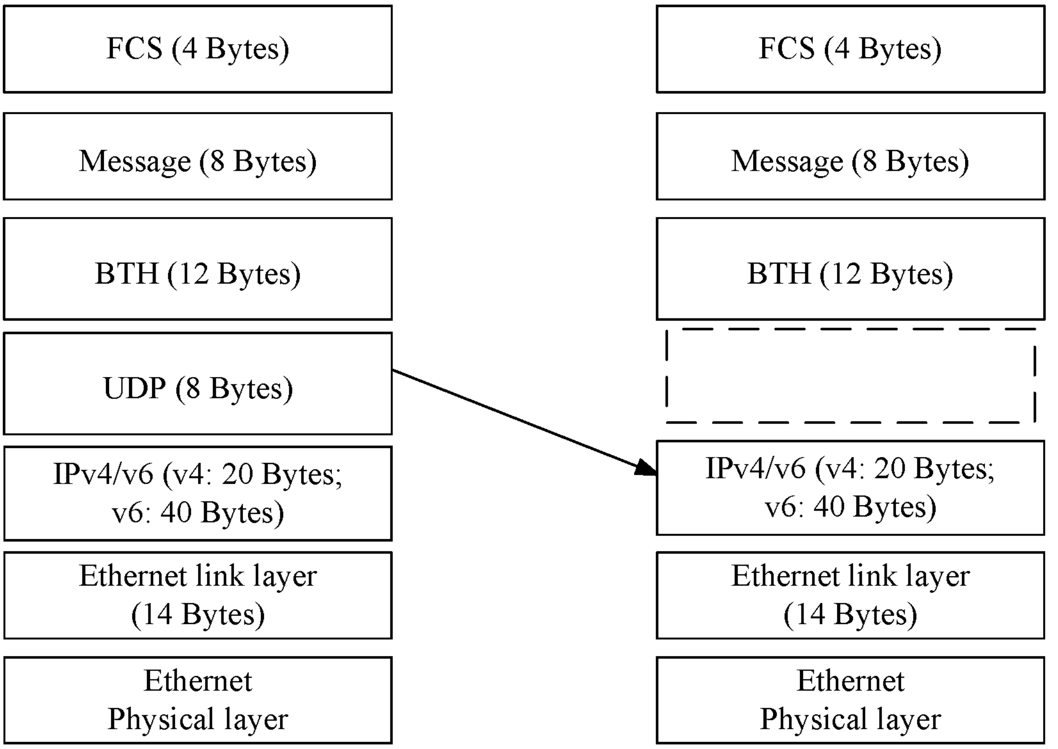
FIG. 4A is a schematic diagram of another packet format comparison according to an embodiment of this disclosure.
Figure 4B:
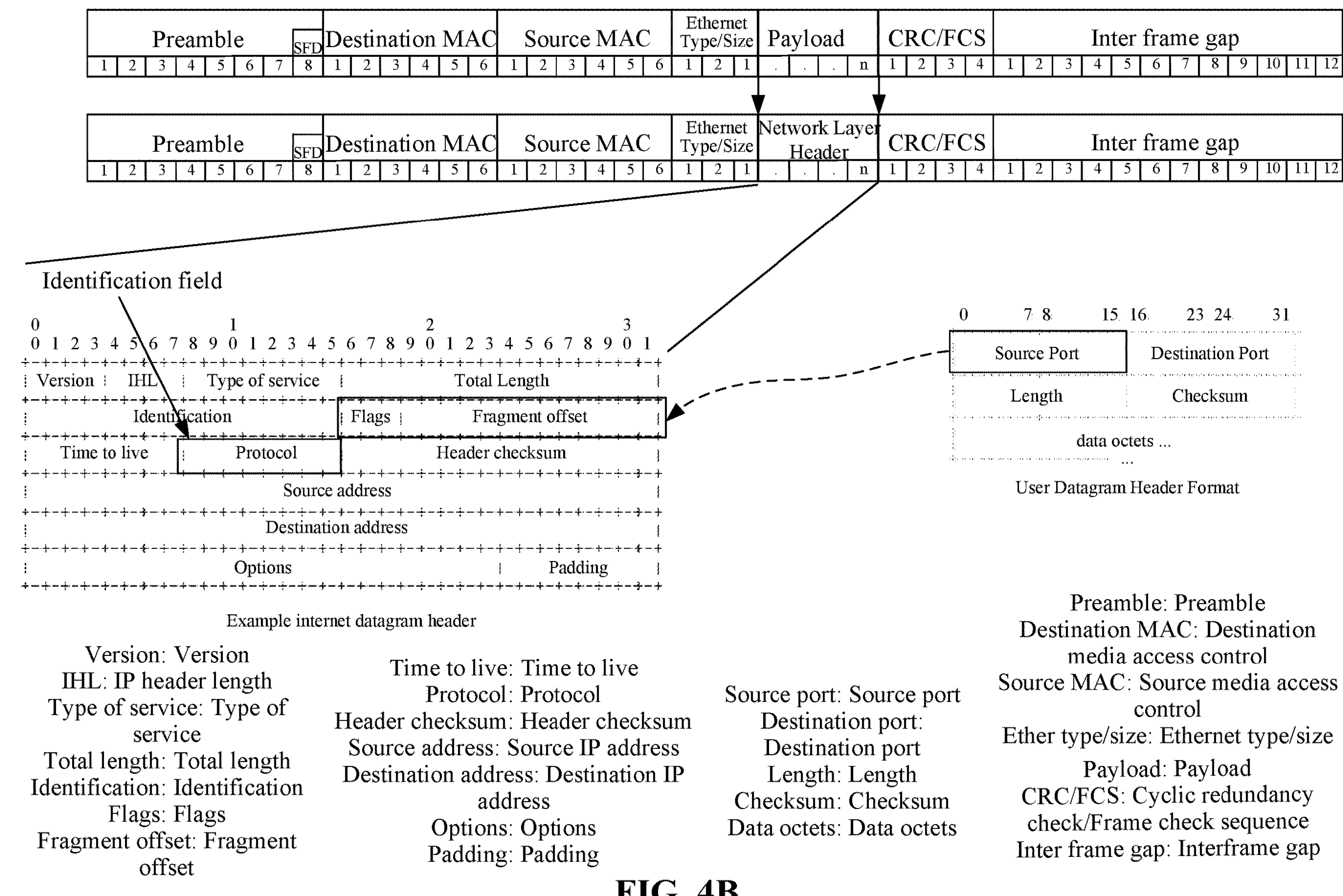
FIG. 4B is a schematic diagram of a packet format comparison in another form according to an embodiment of this disclosure.

A specific position of the identification field in the first-layer header may be shown in FIG. 3B, or shown in FIG. 4B. Alternatively, the Institute of Electrical and Electronics Engineers (IEEE) 802.1Q standard is used as an example, and the identification field may be shown in FIG. 3C. The position of the identification field is not limited in this embodiment of this disclosure. It may be understood that the position of the identification field may be a byte shown in FIG. 3B, FIG. 3C, and FIG. 4B, or may be one bit or at least two bits in the byte shown in FIG. 3B, FIG. 3C, and FIG. 4B, or the like, which is not limited in this embodiment of this disclosure.

It may be understood that the schematic diagram shown in FIG. 3C is on the basis of FIG. 1D or FIG. 3B, for example, an 802.1Q header is added in the packet when compared with FIG. 1D and FIG. 3B.

It may be understood that, for specific description of the first-layer header and the second-layer header, reference may be made to the detailed description above. Details are not described herein again. The following describes the method shown in FIG. 2 by using an example in which the first-layer header includes a link layer header and the second-layer header includes a network layer header and a transport layer header.

In a possible implementation, when the identification field carries the first identifier, the link layer header includes any one or more of source IP address information, destination IP address information, or source port information. The source IP address information and the destination IP address information belong to information in the network layer header, and the source port information belongs to information in the transport layer header.

In a possible implementation, the link layer header further includes type of service TOS information, and the TOS information belongs to the information in the network layer header.

As shown in FIG. 3A, the left example diagram in FIG. 3A may be understood as: when the identification field carries the second identifier, the link layer (Ethernet link layer) header of the first packet does not include the information in the network layer header and the transport layer header. The right example diagram in FIG. 3A may be understood as: when the identification field carries the first identifier, the link layer header of the first packet includes a part of the information in the network layer header and the transport layer header, and the first packet does not include the network layer header and the transport layer header. It may be understood that, for specific description of a physical layer (Ethernet physical layer) shown in FIG. 3A, reference may be made to related standards or protocols or the like. Details are not described in this embodiment of this disclosure.

As shown in FIG. 3B, the upper example diagram in FIG. 3B corresponds to the left example diagram in FIG. 3A, and the lower example diagram in FIG. 3B corresponds to the right example diagram in FIG. 3A. For example, for an IP-routed data center network, source MAC address information and destination MAC address information in the link layer header are generally used for communication between a server and a gateway. However, when the server communicates with the gateway, it is still necessary to map an IP address of the server to a MAC address, and a length of the IP address is less than a length of the MAC address. Therefore, in FIG. 3B, a source MAC address field and a destination MAC address field included in the link layer header may be used to carry a part of the information in the network layer header and the transport layer header. For example, the link layer header may include 1-byte TOS information, 4-byte source IP address information, 4-byte destination IP address information, and 2-byte source port information. The source IP address information and the destination IP address information may be used for routing and the like, the source port information may be used for load balancing, and the TOS information may be used for scheduling and the like. It may be understood that a bit length of each piece of information included in the link layer header shown in FIG. 3B is merely an example. The bit length thereof may vary with a corresponding protocol or packet format, which is not limited in this embodiment of this disclosure.

It may be understood that, for specific description of a preamble, cyclic redundancy check (CRC) (or referred to as an FCS), or an interframe gap shown in FIG. 3B, reference may be made to related standards or protocols or the like. Details are not described in this embodiment of this disclosure.

The following briefly analyzes reasons why the first packet in this embodiment of this disclosure may not include the network layer header and the transport layer header.

Because there is no need for distinguishing between versions for the first packet provided in this embodiment of this disclosure, the first packet may not require a version field. Because the first packet does not include the network layer header, the first packet may not require an IHL field used for describing a length of the network layer header or a total length field used for describing a total length of the network layer header and data, either. A length of the first packet is relatively small, and therefore the first packet does not require an identification field, a flags field, and a fragment offset field that are used for fragment reassembly, either. In a data communication network (DCN), an IP routing mechanism ensures no loop, and therefore a time to live field is not required, either. For a RoCE protocol, a UDP layer is above an IP layer, and an additional protocol field is not required. The first packet includes a CRC field, and therefore a header checksum field is not required, either. For RoCE, a destination port is a fixed port (for example, an identifier of the fixed port is 4791), and therefore the destination port field is not required, either. Because the first packet does not include the transport layer header, the first packet does not require a length field and a checksum field in the transport layer header.

The following describes the method shown in FIG. 2 by using an example in which the first-layer header is a network layer header and the second-layer header is a transport layer header.

In a possible implementation, when the identification field carries the first identifier, the network layer header includes source port information, and the source port information belongs to the information in the transport layer header. In this case, a protocol field in the network layer header may be used to carry the first identifier or the second identifier, that is, a position occupied by the protocol field may be understood as the identification field.

As shown in FIG. 4A, the left example diagram in FIG. 4A may be understood as when the identification field carries the second identifier, the network layer header of the first packet does not include the information in the transport layer header. The right example diagram in FIG. 4A may be understood as when the identification field carries the first identifier, the network layer header of the first packet includes a part of the information in the transport layer header, and the first packet does not include the transport layer header. As shown in FIG. 4B, the upper example diagram in FIG. 4B corresponds to the left example diagram in FIG. 4A, and the lower example diagram in FIG. 4B corresponds to the right example diagram in FIG. 4A.

It may be understood that for specific description of FIG. 4A and FIG. 4B, reference may be made to the description of FIG. 3A and FIG. 3B. Details are not described herein again.

The following describes a method for obtaining a first packet by the transmit end.

In some implementations, the transmit end may directly generate the first packet, that is, directly generate the first packet based on a format of the first packet.

In this embodiment of this disclosure, a type of an IP address may be IPv4 or IPv6. Because a length an IPv6 address is greater than a length of an IPv4 address, when generating the first packet, the transmit end may directly compress the length of the IPv6 address; or may map the 16-byte IP address to 4-byte space; or extract meaningful byte information from an IPv6 address field; or extract valid address information or the like from the IPv6 address field. No limitation is imposed on how to compress or extract the IPv6 address in this embodiment of this disclosure.

In some other implementations, the transmit end may generate a second packet first, and then obtain the first packet based on the second packet. For a format of the second packet, reference may be made to FIG. 1A to FIG. 1D, or to the left example diagram in FIG. 3A and the upper example diagram in FIG. 3B, or to the left example diagram in FIG. 4A and the upper example diagram in FIG. 4B.

Optionally, the transmit end may generate the second packet first, and then extract a part of information in a network layer header and a transport layer header of the second packet. The source MAC address field and the destination MAC address field in the link layer header are overwritten by extracted source IP address information, destination IP address information, TOS information, and source port information. In addition, a value of the identification field in the link layer header is rewritten, and the network layer header and the transport layer header are deleted. For example, when the transmit end obtains the first packet based on the second packet, the obtaining may be performed in a protocol stack of an operating system of the transmit end, or may be performed in a network adapter connected to the protocol stack of the operating system of the transmit end, or may be performed in a device or a chip between the network adapter connected to the protocol stack of the operating system of the transmit end and a switch, which is not limited in this embodiment of this disclosure.

In this embodiment of this disclosure, a payload corresponding to the link layer header of the first packet may be the same as a payload corresponding to the transport layer header of the second packet. As shown in FIG. 3A, the message in the left example diagram in FIG. 3A may be the same as the message in the right example diagram in FIG. 3A. Alternatively, the message and the BTH in the left example diagram in FIG. 3A may be the same as the message and the BTH in the right example diagram in FIG. 3A. Alternatively, the payload in the upper example diagram in FIG. 3B may be the same as the payload in the lower example diagram in FIG. 3B.

Optionally, the transmit end may alternatively directly generate the first packet based on the second packet. In other words, after extracting a part of information in the network layer header and the transport layer header of the second packet, the transmit end may directly place extracted information into a corresponding field of the first packet. In addition, a value is assigned to the identification field of the first packet.

It may be understood that the foregoing method for obtaining a first packet illustrated above is merely an example, and no limitation is imposed on how the transmit end obtains the first packet in this embodiment of this disclosure. In addition, the foregoing method for obtaining a first packet is illustrated above by using an example in which the first-layer header is a link layer header and the second-layer header as a network layer header and a transport layer header. For description about a case in which the first-layer header is a network layer header and the second-layer header is a transport layer header, refer to the foregoing description. Details are not described herein again.

202. The transmit end sends the first packet.

In a possible implementation, the method shown in FIG. 2 may further include steps 203 to 205.

203. The intermediate node schedules the first packet to a corresponding queue based on the TOS information included in the link layer header.

Figure 5A:
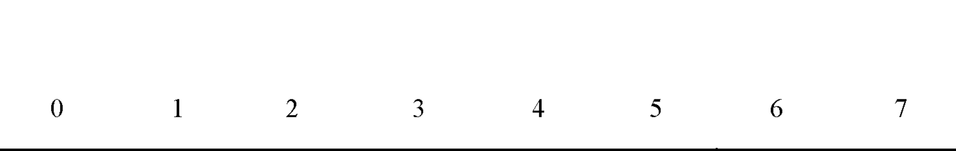
FIG. 5A is a schematic diagram of content of TOS information according to an embodiment of this disclosure.

In this embodiment of this disclosure, as shown in FIG. 5A, the TOS information may include differentiated service code point (DSCP) information and/or ECN information. The DSCP information may be used to indicate priority information of the queue of the first packet, and the ECN information may be used to indicate whether the first packet is congested (that is, whether the first packet has experienced congestion). Optionally, the intermediate node may make a quality of service (QoS) scheduling decision based on the DSCP information in the first packet. For example, the intermediate node schedules the first packet to the corresponding queue based on the DSCP information.

Optionally, when a queue depth of the corresponding queue is greater than or equal to a depth threshold, the ECN information be marked ECN information. The queue depth is used to represent a degree of congestion of the corresponding queue. The depth threshold is used to measure a value of the degree of congestion of the corresponding queue at which the intermediate node marks the first packet. Therefore, a specific value of the depth threshold is not limited in this embodiment of this disclosure. In other words, if the corresponding queue is congested, the intermediate node may mark the first packet with an ECN mark. Alternatively, if the corresponding queue is congested, the intermediate node may perform ECN marking on the ECN information. No limitation is imposed on how the intermediate node performs ECN marking and a specific form of the marked ECN information in this embodiment of this disclosure.

204. The intermediate node receives the first packet, and forwards the first packet based on the destination IP address information included in the link layer header.

In other words, the intermediate node obtains the first packet, forwards the first packet based on the destination IP address information included in the link layer header of the first packet.

205. The receive end receives the first packet, and processes the first packet based on information in the first-layer header of the first packet.

In this embodiment of this disclosure, the receive end may form a session identifier based on source IP address information, destination IP address information, and source port information (fixed port information) in the first-layer header of the first packet, and determine a corresponding application process based on the session identifier. The application process may be used to process the first packet.

Figure 6:
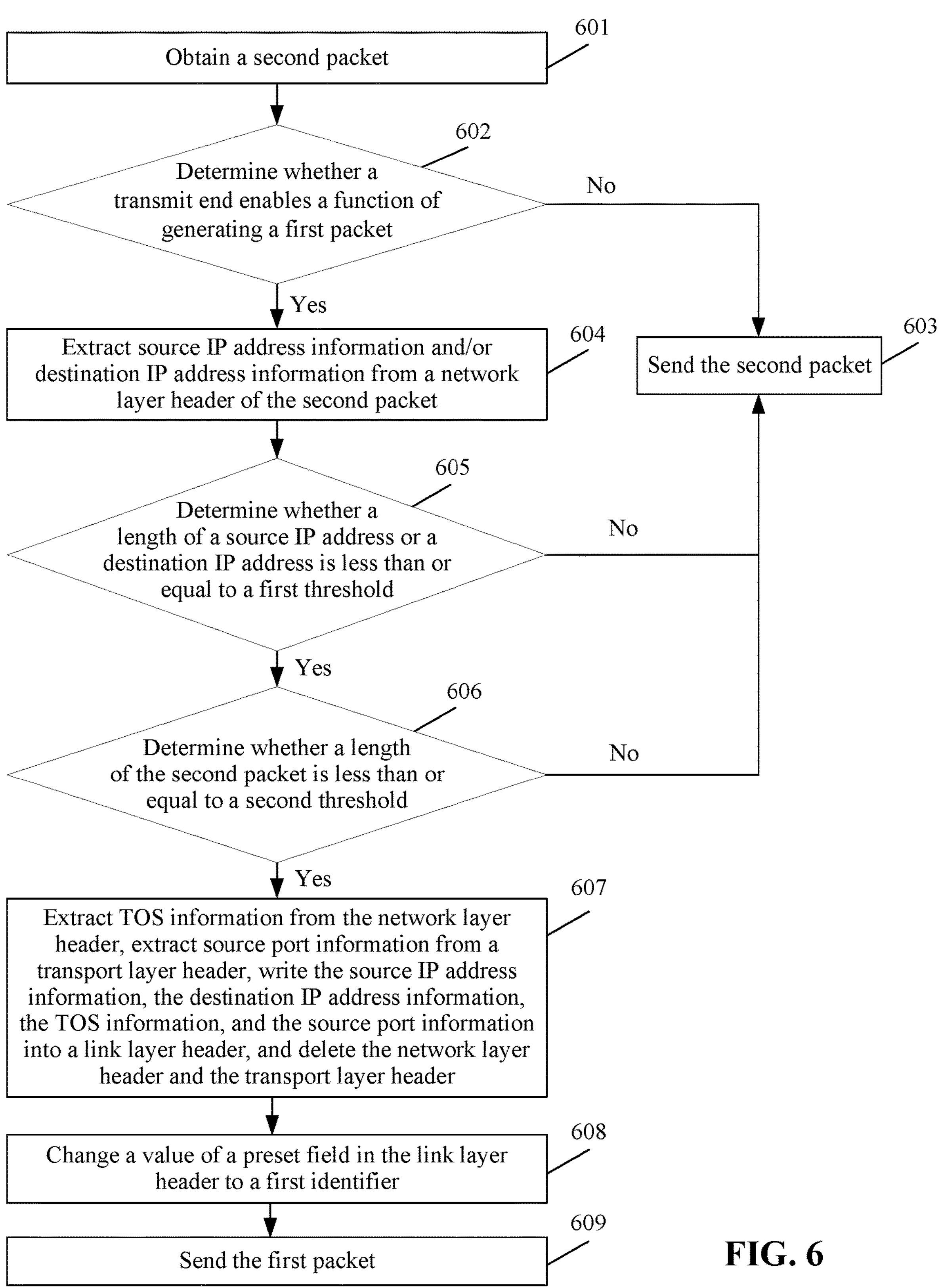
FIG. 6 is a schematic flowchart of a method for processing a packet by a transmit end according to an embodiment of this disclosure.
Figure 7:
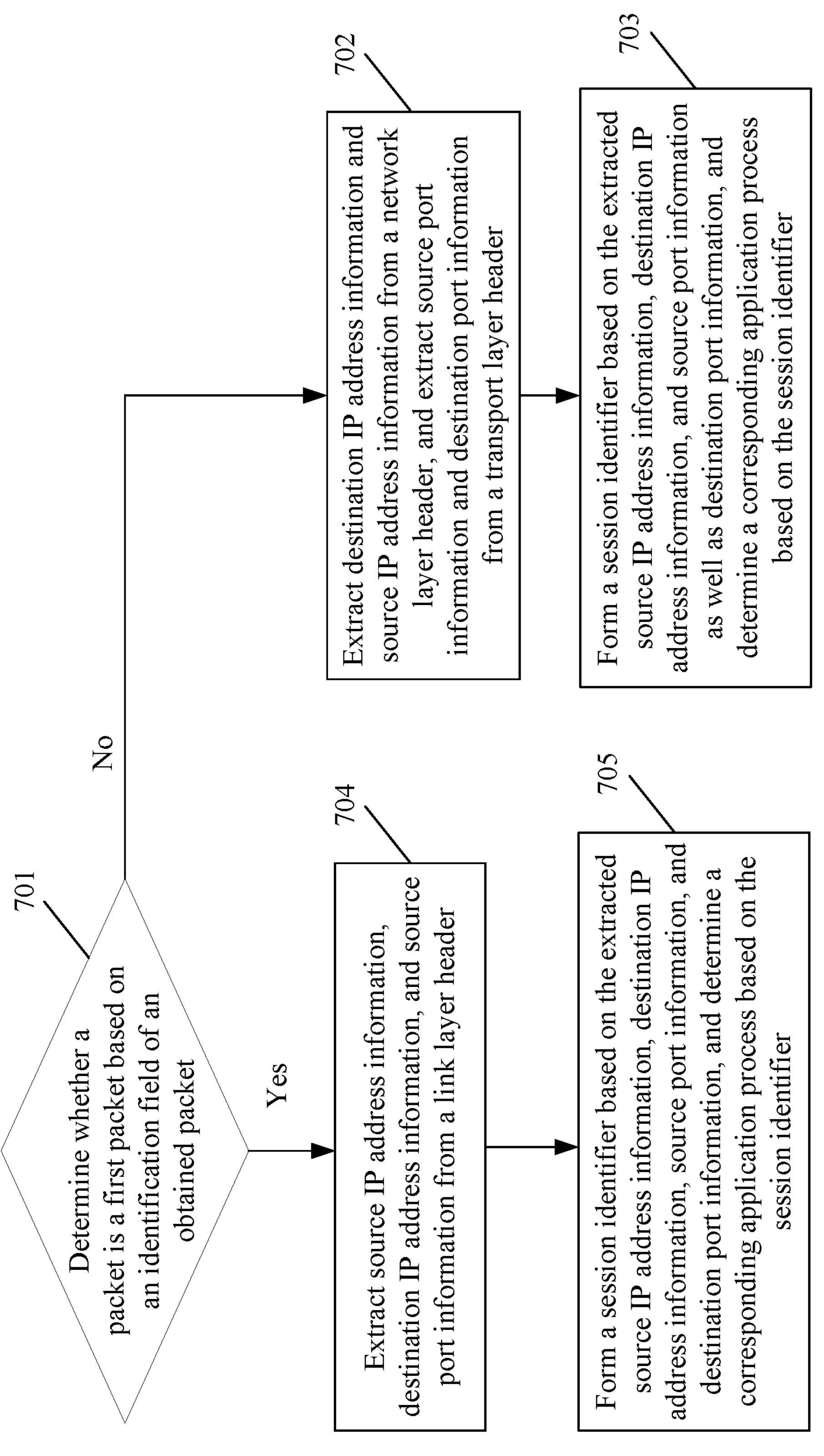
FIG. 7 is a schematic flowchart of a method for processing a packet by a receive end according to an embodiment of this disclosure.
Figure 8:
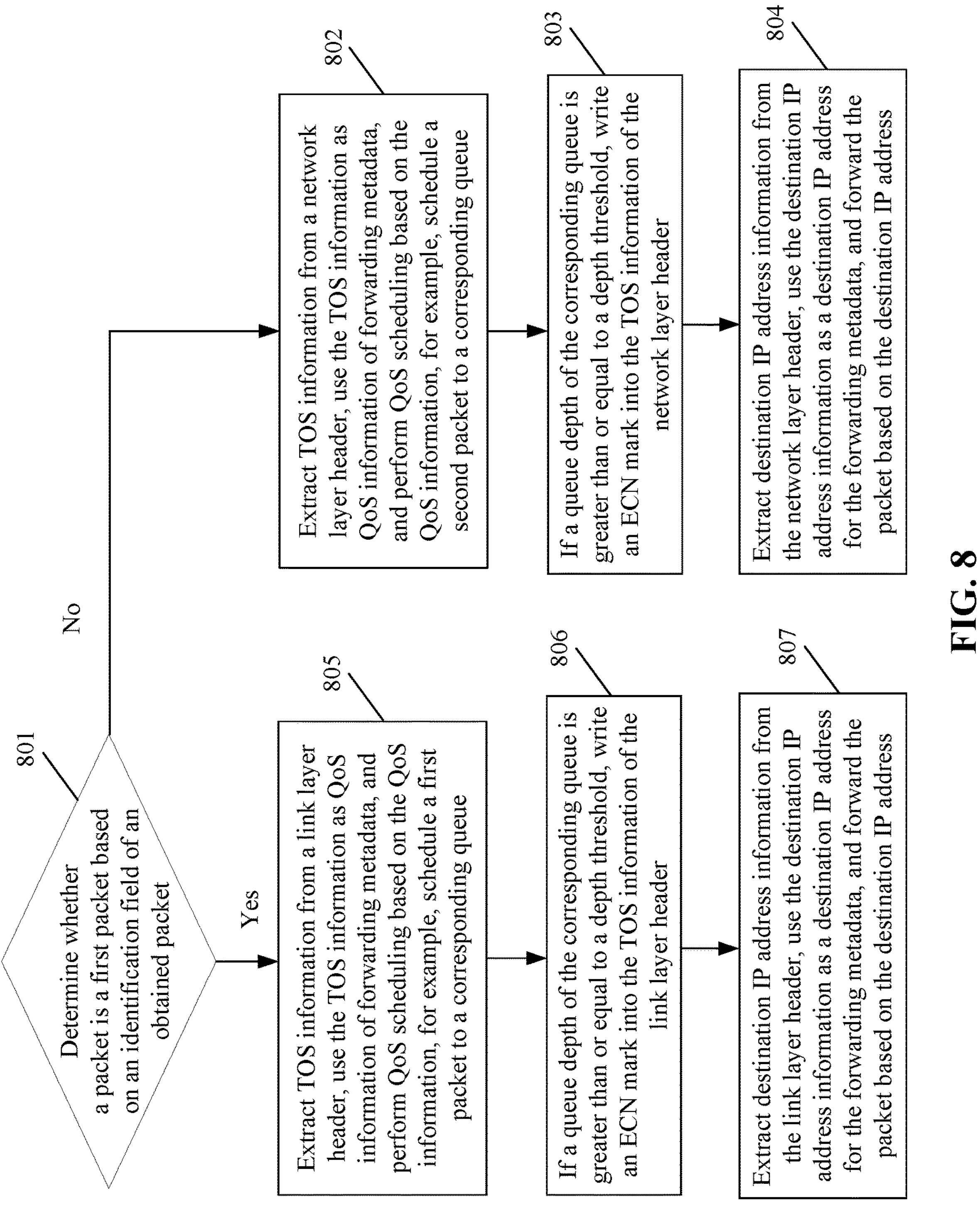
FIG. 8 is a schematic flowchart of method for processing a packet by an intermediate node according to an embodiment of this disclosure.

It may be understood that for specific description about processing the first packet by the transmit end, the intermediate node, and the receive end, reference may also be made to FIG. 6 to FIG. 8 shown below.

In this embodiment of this disclosure, key information in the second-layer header of the first packet is selectively retained, and information is selectively detected from the first-layer header, so that fields in the first-layer header may be used to carry the key information in the second-layer header. This not only reduces overheads of the first packet, but also can achieve compatibility with an ethernet. Further, efficiency in transmitting the first packet (or referred to as encapsulation efficiency) can also be improved in this embodiment of this disclosure, and compatibility with an ethernet link layer and IP forwarding can be maintained.

Moreover, in the first packet, the key information in the second-layer header is retained, some non-key information is discarded, and in addition, the second-layer header is deleted, which saves encapsulation space or overheads or the like. Therefore, the solution provided in this embodiment of this disclosure is different from mapping between information domains. For example, a conventional solution of mutual mapping of priority information between DSCP information in a network layer and a priority code point (PCP) in a link layer is mutual mapping between information in the network layer and information in the link layer, so that a layer 2 switching device can learn the PCP information, and a layer 3 switching device can learn the DSCP information. That is, in the solution of mutual mapping, a specific switching device usually can learn only information in a specific layer header. If another switching device needs to learn information in another layer header, a gateway needs to perform mutual mapping between different layer headers. In other words, the solution of mutual mapping has no retention of key information in some layer headers, and no discarding of non-key information, and therefore naturally encapsulation space or the like is not saved. In addition, the solution provided by this disclosure is also different from a compression technology. For example, a dictionary compression technology is dynamic compression based on string frequency and length statistical analysis. During forwarding of a packet, information in the packet is usually unavailable, that is, a communication apparatus needs to decompress it before recovering original information of the packet.

Figure 5B:
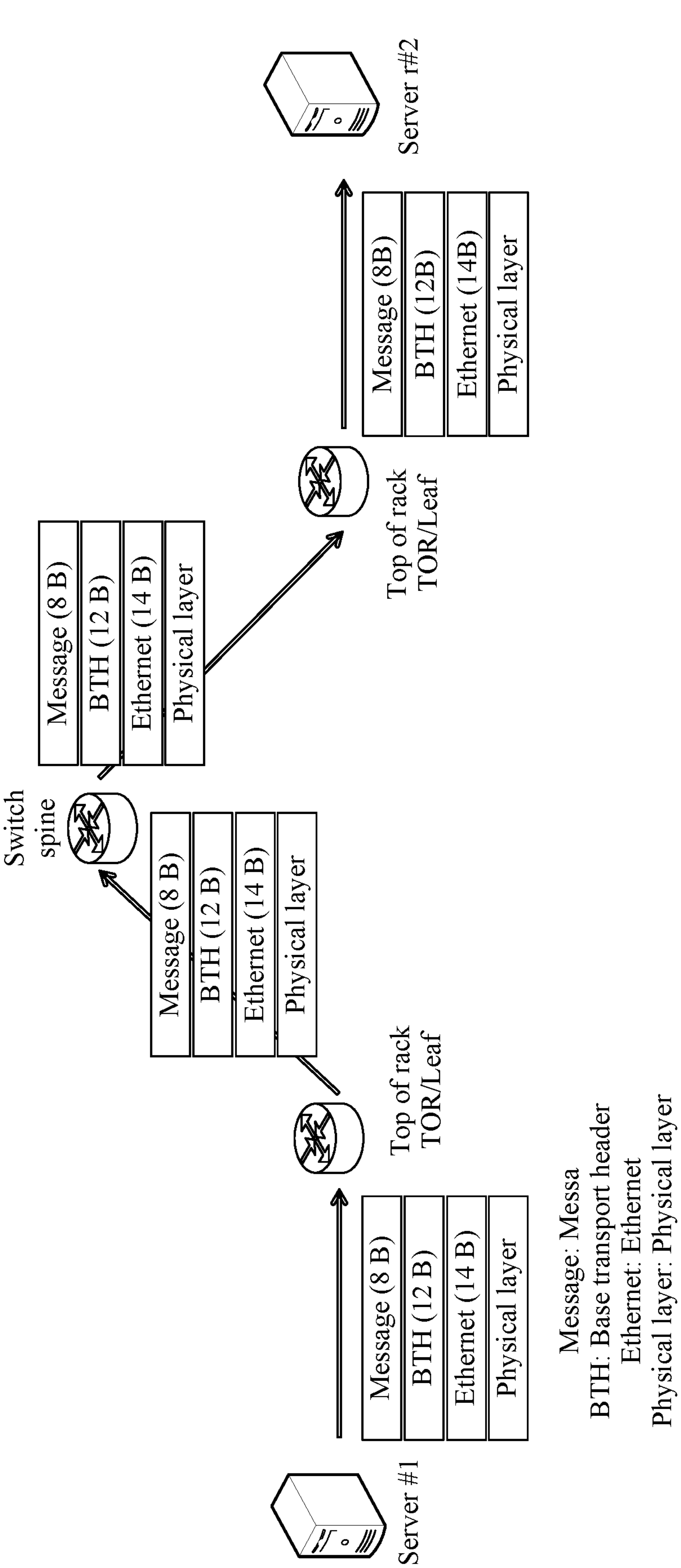
FIG. 5B is a schematic diagram of a structure of a communication system according to an embodiment of this disclosure.

FIG. 5B is a schematic diagram of a structure of a communication system according to an embodiment of this disclosure. As shown in FIG. 5B, a server #1 may be the transmit end shown in FIG. 2, a server #2 may be the receive end shown in FIG. 2, and a device between the server #1 and the server #2 may be the intermediate node shown in FIG. 2. A first packet obtained by the server #1 may include a payload (message), a BTH, and a link layer header (Ethernet). Then the server #1 sends the first packet, and after obtaining the first packet, a switch may forward the first packet based on information (that is, destination IP address information) carried in a destination MAC address field of the first packet. It may be understood that, for specific steps performed by nodes in the communication system shown in FIG. 5B, reference may be made to the method shown in FIG. 2, or to FIG. 6 to FIG. 8 shown below.

To understand the method shown in FIG. 2 more visually, embodiments of this disclosure further provide methods for processing a packet, which are respectively shown in FIG. 6 to FIG. 8. It may be understood that the following embodiments are illustrated below by using an example in which a first-layer header includes a link layer header and a second-layer header includes a network layer header and a transport layer header. However, for other examples of the first-layer header and the second-layer header, refer to the embodiments shown in FIG. 6 to FIG. 8. Details are not described herein in embodiments of this disclosure.

FIG. 6 is a schematic flowchart of a method for processing a first packet according to an embodiment of this disclosure. The method may be applied to a transmit end. As shown in FIG. 6, the method includes the following steps.

601. Obtain a second packet.

602. Determine whether the transmit end enables a function of generating the first packet, and if the function of generating the first packet is enabled, perform step 604; or if the first packet is not enabled, perform step 603.

603. Send the second packet.

In this embodiment of this disclosure, the transmit end may generate the second packet based on the formats shown in FIG. 1A to FIG. 1D.

604. Extract source IP address information and/or destination IP address information from a network layer header of the second packet.

605. Determine whether a length of a source IP address or a destination IP address is less than or equal to a first threshold, and if the length is less than or equal to the first threshold, perform step 606; or if the length is greater than the first threshold, perform step 603.

In this embodiment of this disclosure, the first threshold may be 4 bytes, or the first threshold may be a value less than 4 bytes, or the like.

606. Determine whether a length of the second packet is less than or equal to a second threshold (which is a length threshold), and if the length is less than or equal to the second threshold, perform step 607; or if the length is greater than the second threshold, perform step 603.

Optionally, step 606 may also be replaced by the following: determining whether a length of a payload corresponding to a link layer header of the second packet is less than or equal to a third threshold; or determining whether a length of a payload corresponding to the network layer header of the second packet is less than or equal to a fourth threshold; or determining whether a length of a payload corresponding to a transport layer header of the second packet is less than or equal to a fifth threshold.

In this embodiment of this disclosure, the fifth threshold may be 32 bytes, or the fifth threshold may be a value less than 32 bytes, or the like. Correspondingly, for a RoCEv2 packet, except for an unfixed length of a payload corresponding to a transport layer header, other lengths of, for example, a link layer header, a network layer header, or the transport layer header are all fixed. Therefore, the second threshold, the third threshold, and the fourth threshold all may be obtained based on the fifth threshold.

Optionally, the foregoing step 606 may also be replaced by the following: determining whether a preset port identifier carried in a destination port field in the transport layer header of the second packet is 4791, and if the preset port identifier is 4791, performing step 607; or if the preset port identifier is not 4791, performing step 603.

It may be understood that the 4791 illustrated herein is merely a preset port identifier in the case of a RoCEv2 packet, and however, for another type of packet, the preset port identifier may vary, which is not limited in this embodiment of this disclosure.

607. Extract TOS information from the network layer header, extract source port information from the transport layer header, write the source IP address information, the destination IP address information, the TOS information, and the source port information into the link layer header, and delete the network layer header and the transport layer header.

608. Change a value of a preset field in the link layer header to a first identifier.

609. Send the first packet.

It may be understood that an order of the foregoing steps is not limited in this embodiment of this disclosure. For example, an order of steps 604 and 605 and step 606 is not limited. For another example, an order of step 607 and step 608 is not limited.

FIG. 7 is a schematic flowchart of a method for processing a first packet according to an embodiment of this disclosure. The method may be applied to a receive end. As shown in FIG. 7, the method includes the following steps.

701. Obtain a packet, determine whether the packet is a first packet based on an identification field of the obtained packet, and if the packet is the first packet, perform step 704; or if the packet is not the first packet, for example, if the packet is a second packet, perform step 702.

702. Extract destination IP address information and source IP address information from a network layer header, and extract source port information and destination port information from a transport layer header.

Optionally, the receive end may further extract an IP protocol type from the network layer header. The destination IP address information, the source IP address information, the IP protocol type, the source port information, and the destination port information may also be collectively referred to as 5-tuple information.

703. Form a session identifier based on the extracted source IP address information, destination IP address information, source port information, and destination port information, and determine a corresponding application process based on the session identifier.

In this embodiment of this disclosure, the determined application process may be used to process the packet, and no limitation is imposed on how the application process processes the packet is not limited in this embodiment of this disclosure.

704. Extract source IP address information, destination IP address information, and source port information from a link layer header.

705. Form a session identifier based on the extracted source IP address information, destination IP address information, and source port information as well as destination port information (which is a fixed port), and determine a corresponding application process based on the session identifier.

Optionally, when obtaining the first packet, the receive end may alternatively restore the first packet to the second packet. For example, a network layer header and a transport layer header are inserted into the first packet, for example, the source IP address information and destination IP address information extracted from the link layer header are filled into the inserted network layer header; for another example, the source port information extracted from the link layer header is filled into the inserted transport layer header. Values of other fields in the network layer header and the transport layer header may be filled (or referred to as "written") on the basis of complying with IP (such as IETF RFC 791) and UDP (such as IETF RFC 768) specifications.

For example, an identification field in the network layer header may be filled randomly, an IHL field may be filled based on a length of the inserted network layer header, a version field may be filled with 4, a frags field and a fragment field may be filled with 0, a total length field may be filled based on an actual packet length, and a header checksum field may be filled based on an actual inserted network layer header. For example, in the transport layer header, a destination port field may be filled with 4791, a length field is filled based on a packet length, and a checksum field is filled based on the UDP specification.

In this embodiment of this disclosure, after the receive end obtains the packet, if the identification field of the packet indicates that the packet is the first packet, the receive end may directly extract related information from the link layer header of the first packet, to form the session identifier, which improves information extraction efficiency, thereby improving efficiency of the application process in processing the first packet.

FIG. 8 is a schematic flowchart of a method for processing a first packet according to an embodiment of this disclosure. The method may be applied to an intermediate node. As shown in FIG. 8, the method includes the following steps.

801. Obtain a packet, determine whether the packet is a first packet based on an identification field of the obtained packet, and if the packet is the first packet, perform step 805; or if the packet is not the first packet, for example, if the packet is a second packet, perform step 802.

802. Extract TOS information from a network layer header, use the TOS information as QoS information of forwarding metadata, and perform QoS scheduling based on the QoS information, for example, schedule the second packet to a corresponding queue.

In this embodiment of this disclosure, the forwarding metadata may be understood as a fixed-length descriptor constructed by the intermediate node for extracting forwarding information from the packet.

803. If a queue depth of the corresponding queue is greater than or equal to a depth threshold, write an ECN mark into the TOS information of the network layer header.

804. Extract destination IP address information from the network layer header, use the destination IP address information as a destination IP address for the forwarding metadata, and forward the packet based on the destination IP address.

Optionally, the intermediate node may further extract source IP address information from the network layer header and source port information from a transport layer header, and perform load balancing based on the source IP address information, the destination IP address information, and the source port information.

805. Extract TOS information from a link layer header, use the TOS information as QoS information of forwarding metadata, and perform QoS scheduling based on the QoS information, for example, schedule the first packet to a corresponding queue.

806. If a queue depth of the corresponding queue is greater than or equal to a depth threshold, write an ECN mark into the TOS information of the link layer header.

807. Extract destination IP address information from the link layer header, use the destination IP address information as a destination IP address for the forwarding metadata, and forward the packet based on the destination IP address.

Optionally, the intermediate node may further extract source IP address information and source port information from the link layer header, and perform load balancing based on the source IP address information, the destination IP address information, and the source port information.

In this embodiment of this disclosure, after the intermediate node obtains the packet, if the identification field of the packet indicates that the packet is the first packet, the intermediate node may directly extract related information from the link layer header of the first packet, to forward the packet, or to schedule the packet, or to mark the packet, which improves information extraction efficiency.

The following describes an apparatus provided in an embodiment of this disclosure.

Figure 9:
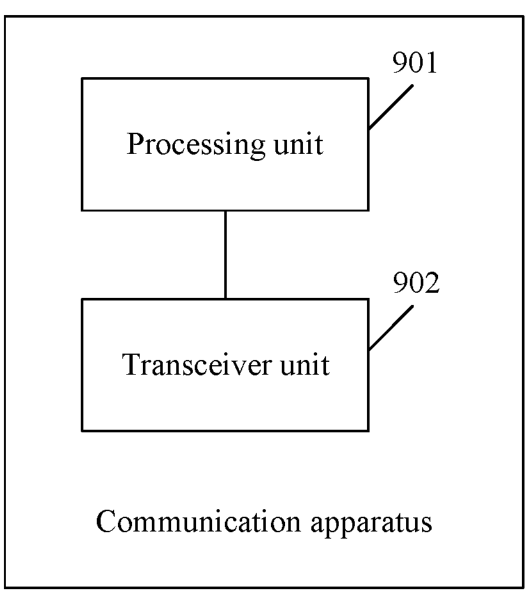
FIG. 9 is a schematic diagram of a structure of a communication apparatus according to an embodiment of this disclosure.

FIG. 9 is a schematic diagram of a structure of a communication apparatus according to an embodiment of this disclosure. As shown in FIG. 9, the communication apparatus includes a processing unit 901 and a transceiver unit 902.

In some embodiments of this disclosure, the communication apparatus may be configured to perform functions (or steps or operations or the like), performed by a transmit end, in the foregoing embodiments. For example, the communication apparatus may be configured to perform step 201 and step 202 shown in FIG. 2, or the communication apparatus may be further configured to perform the steps shown in FIG. 6 and the like.

For example, the processing unit 901 is configured to obtain a first packet, and the transceiver unit 902 is configured to output the first packet. Alternatively, this may also be understood as the processing unit is configured to obtain a first packet, and output the first packet by using the transceiver unit.

It may be understood that, that the processing unit 901 is configured to obtain the first packet may also be understood as generating the first packet.

For example, the processing unit 901 is further configured to obtain a second packet, and then generate the first packet based on the second packet.

For example, the processing unit 901 may further generate the first packet based on the second packet when a length of the second packet is less than a length threshold, and/or when a destination port field in the transport layer header of the second packet carries a preset port identifier.

In this embodiment of this disclosure, the processing unit 901 may be further configured to perform step 201 shown in FIG. 2, and the transceiver unit 902 may be further configured to perform step 202 shown in FIG. 2. Alternatively, the processing unit 901 may be further configured to perform step 601, step 602, and step 604 to step 608 shown in FIG. 6 and the like, and the transceiver unit 902 may be further configured to perform step 603 or step 609 shown in FIG. 6.

In some other embodiments of this disclosure, the communication apparatus may be configured to perform functions (or steps or operations or the like), performed by an intermediate node, in the foregoing embodiments. For example, the communication apparatus may be configured to perform step 203 and step 204 shown in FIG. 2, or the communication apparatus may be further configured to perform the steps shown in FIG. 8 and the like.

For example, the transceiver unit 902 is configured to obtain the first packet (or may be understood as "configured to input the first packet"), and the processing unit 901 is configured to schedule the first packet to a corresponding queue based on the first packet. Optionally, the transceiver unit 902 may be further configured to forward the first packet based on the first packet. Alternatively, this may also be understood as the processing unit is configured to obtain the first packet by using the transceiver unit, and schedule the first packet to a corresponding queue.

It may be understood that in a possible implementation, the processing unit 901 may schedule the first packet to the corresponding queue based on TOS information included in a link layer header of the first packet, as described in related description of FIG. 3A to FIG. 3C in the foregoing embodiments.

In another possible implementation, the processing unit 901 may alternatively schedule the first packet to the corresponding queue based on TOS information included in a network layer header of the first packet, as described in related description of FIG. 4A and FIG. 4B.

In this embodiment of this disclosure, the processing unit 901 may be further configured to perform step 203 shown in FIG. 2, and the transceiver unit 902 may be further configured to perform step 204 shown in FIG. 2. Alternatively, the processing unit 901 may be further configured to perform step 801 to step 803 shown in FIG. 8, and the transceiver unit 902 may be further configured to perform step 804 shown in FIG. 8. Alternatively, the processing unit 901 may be further configured to perform step 801, step 805, and step 806 shown in FIG. 8, and the transceiver unit 902 may be further configured to perform step 807 shown in FIG. 8.

In still some other embodiments of this disclosure, the communication apparatus may be configured to perform functions (or steps or operations or the like), performed by a receive end, in the foregoing embodiments. For example, the communication apparatus may be configured to perform step 205 shown in FIG. 2, or the communication apparatus may be further configured to perform the steps shown in FIG. 7 and the like.

The transceiver unit 902 is configured to obtain the first packet, and the processing unit 901 is configured to determine an application process based on the first packet. The application process is used to process the first packet. Alternatively, this may also be understood as the processing unit is configured to obtain the first packet by using the transceiver unit, and determine the application process based on the first packet.

It may be understood that the processing unit may form a session identifier based on source IP address information, destination IP address information, source port information, and destination port information (which is a fixed port) in the link layer header of the first packet, and determine a corresponding application process based on the session identifier, as described in related description of FIG. 3A to FIG. 3C. Alternatively, the processing unit may further form a session identifier based on source IP address information, destination IP address information, source port information, and destination port information (which is a fixed port) in the network layer header of the first packet, and determine a corresponding application process based on the session identifier, as described in related description of FIG. 4A to FIG. 4B.

In this embodiment of this disclosure, the processing unit 901 may be further configured to perform step 205. Alternatively, the processing unit 901 may be further configured to perform step 701 shown in FIG. 7, or steps 702 and 703, or steps 704 and 705 shown in FIG. 7.

In the foregoing various embodiments, for specific implementations of the transceiver unit and the processing unit, reference may also be made to related description of FIG. 2 to FIG. 8. Details are not described herein again.

In the foregoing various embodiments, for related description about the first packet, the first-layer header of the first packet, and the like, reference may also be made to related description of FIG. 2 to FIG. 8. Details are not described herein again.

Figure 12:
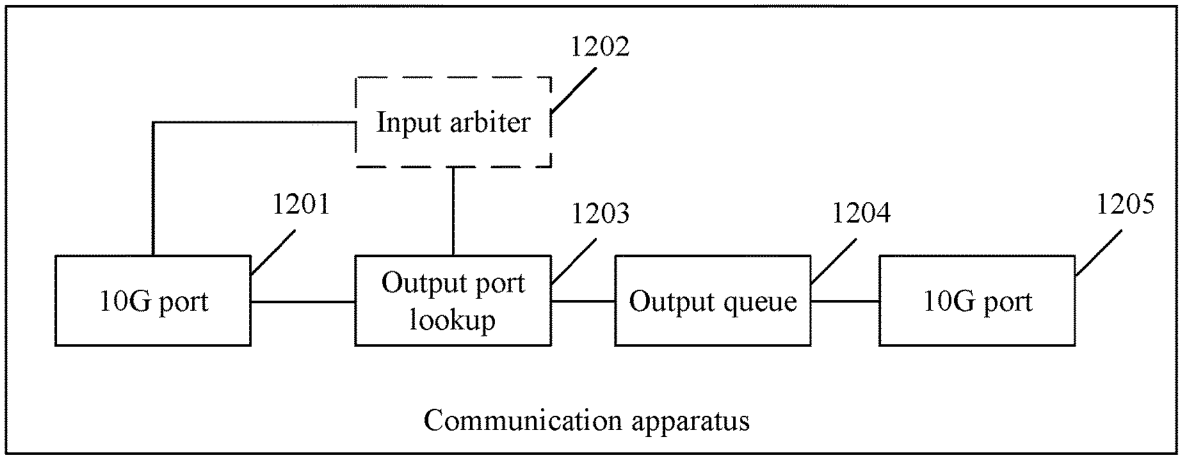
FIG. 12 is a schematic diagram of a structure of yet another communication apparatus according to an embodiment of this disclosure.

In this embodiment of this disclosure, module division is an example, and is merely a logical function division. In actual implementation, as shown in FIG. 12, another division manner may be used. In addition, functional modules or units in the various embodiments of this disclosure may be integrated into one processor, or each of the modules or units may exist alone physically, or two or more modules or units are integrated into one module or unit. The integrated module may be implemented in a form of hardware, or may be implemented in a form of a software functional module.

In a possible implementation, when the communication apparatus shown in FIG. 9 is a server, an access device, or the like, or is an apparatus in a server, an access device, or the like, or is an apparatus matching a server or an access device; or when the communication apparatus shown in FIG. 9 is a switch, a router, a network adapter, or the like, or is an apparatus in a switch, a router, or a network adapter, or is an apparatus matching a switch, a router, or a network adapter, the processing unit 901 may be one or more processors. The transceiver unit 902 may be a transceiver, or the transceiver unit 902 may be a sending unit and a receiving unit. The sending unit may be a sender, the receiving unit may be a receiver, and the sending unit and the receiving unit are integrated in one device, such as a transceiver.

Figure 10:
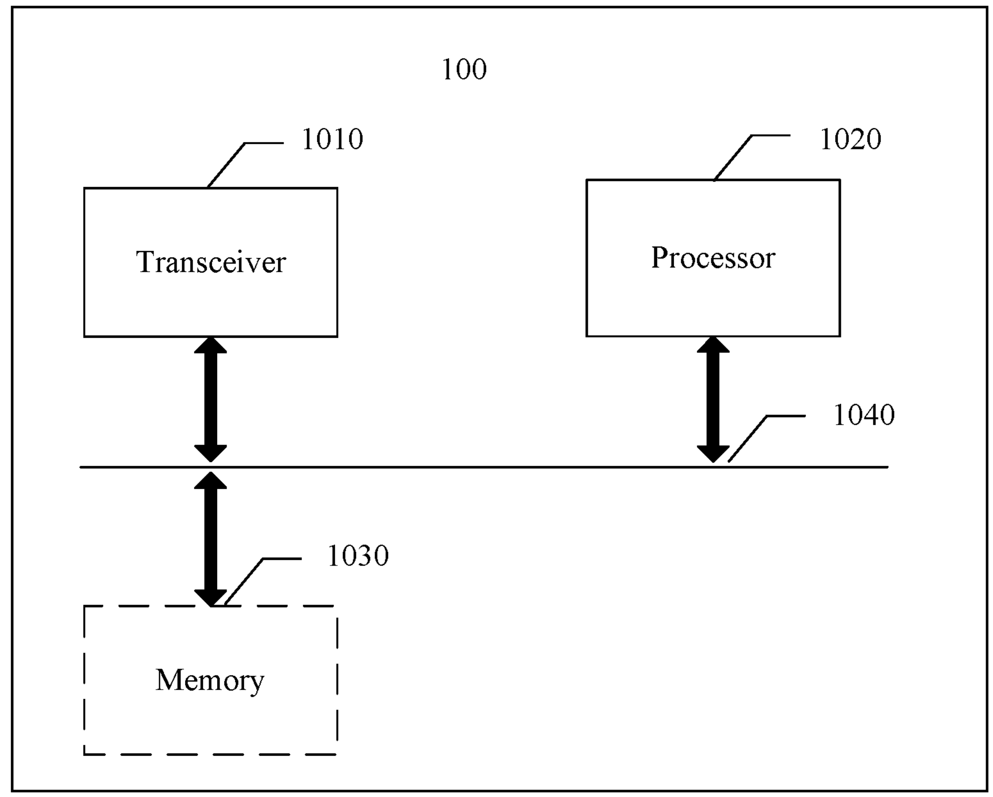
FIG. 10 is a schematic diagram of a structure of another communication apparatus according to an embodiment of this disclosure.

As shown in FIG. 10, the communication apparatus 100 includes one or more processors 1020 and a transceiver 1010. The processor and the transceiver may be configured to perform functions or operations or the like performed when the foregoing communication apparatus is used as a transmit end. For example, in some embodiments of this disclosure, the processor is configured to obtain a first packet, and the transceiver is configured to send the first packet.

Alternatively, the processor and the transceiver may be configured to perform functions or operations or the like performed when the foregoing communication apparatus is used as a receive end. For example, in some other embodiments of this disclosure, the transceiver is configured to obtain a first packet, and the processor is configured to schedule the first packet to a corresponding queue based on the first packet. Optionally, the transceiver 902 may be further configured to forward the first packet based on the first packet.

Alternatively, the processor and the transceiver may be configured to perform functions or operations or the like performed when the foregoing communication apparatus is used as an intermediate node. For example, in still some other embodiments of this disclosure, the transceiver is configured to obtain a first packet, and the processor is configured to determine an application process based on the first packet. The application process is used to process the first packet.

It may be understood that, for functions or operations or the like performed by the transceiver and/or the processor, reference may be made to various embodiments shown in FIG. 9, or reference may also be made to the foregoing method embodiments or the like. Details are not described herein again.

In various implementations of the communication apparatus shown in FIG. 10, the transceiver may include a receiver and a transmitter, the receiver is configured to perform a receiving function (or operation), and the transmitter is configured to perform a transmitting function (or operation). In addition, the transceiver is configured to communicate with other devices/apparatuses through a transmission medium.

Optionally, the communication apparatus 100 may further include one or more memory 1030 configured to store program instructions and/or data. The memory 1030 is coupled to the processor 1020. The coupling in this embodiment of this disclosure is indirect coupling or a communication connection between apparatuses, units, or modules for information exchange between the apparatuses, the units, or the modules, and may be in electrical, mechanical, or other forms. The processor 1020 may cooperate with the memory 1030. The processor 1020 may execute the program instructions stored in the memory 1030. Optionally, at least one of the one or more memories may be included in the processor.

A specific connection medium between the transceiver 1010, the processor 1020, and the memory 1030 is not limited in this embodiment of this disclosure. In this embodiment of this disclosure, the memory 1030, the processor 1020, and the transceiver 1010 are connected through a bus 1040 in FIG. 10. The bus is represented by a thick line in FIG. 10, and connections between other components are merely examples for description, and shall not be construed as a limitation. The bus may be classified into an address bus, a data bus, a control bus, and the like. For ease of representation, only one thick line is for representing the bus in FIG. 10, but this does not mean that there is only one bus or only one type of bus.

In embodiments of this disclosure, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this disclosure. The general-purpose processor may be a microprocessor, or may be any conventional processor or the like. The steps of the method disclosed with reference to embodiments of this disclosure may be directly performed by a hardware processor, or may be performed by a combination of hardware and software modules in the processor.

In embodiments of this disclosure, the memory may include but is not limited to a non-volatile memory such as a hard disk drive (HDD) or a solid-state drive (SSD), a random-access memory (RAM), an erasable programmable read-only memory (EPROM), a read-only memory (ROM), a compact disc ROM (CD-ROM), or the like. The memory is, but not limited to, any storage medium that can be used to carry or store program code in a form of instructions or data structures and that can be read or written by a computer (such as the communication apparatus illustrated in this disclosure). The memory in this embodiment of this disclosure may alternatively be a circuit or any other apparatus that can implement a storage function, and is configured to store program instructions and/or data.

It may be understood that the communication apparatus illustrated in embodiments of this disclosure may have more components than those shown in FIG. 10, which is not limited in embodiments of this disclosure.

It may be understood that the method performed by the processor and the transceiver illustrated above is merely an example, and for specific steps performed by the processor and the transceiver, reference may be made to the method described above.

In another possible implementation, when the foregoing communication apparatus is a chip system, such as a chip system in a server, an access device, a switch, a router, or a network adapter, the processing unit 901 may be one or more logic circuits, and the transceiver unit 902 may be an input/output interface, or also referred to as a communication interface, or an interface circuit, an interface, or the like. Alternatively, the transceiver unit 902 may be a sending unit and a receiving unit. The sending unit may be an output interface, the receiving unit may be an input interface, and the sending unit and the receiving unit are integrated in one device, such as an input/output interface.

Figure 11:
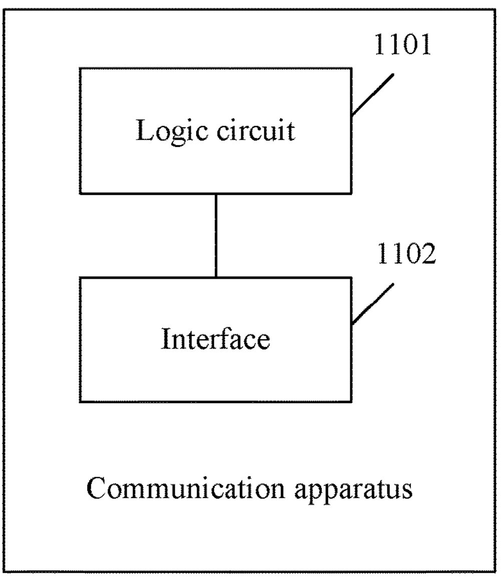
FIG. 11 is a schematic diagram of a structure of still another communication apparatus according to an embodiment of this disclosure.

As shown in FIG. 11, a communication apparatus shown in FIG. 11 includes a logic circuit 1101 and an interface 1102. That is, the foregoing processing unit 901 may be achieved by using the logic circuit 1101, and the transceiver unit 902 may be achieved by using the interface 1102.

Optionally, the logic circuit and the interface may be configured to perform functions or operations or the like performed when the foregoing communication apparatus is used as a transmit end. For example, the logic circuit is configured to obtain a first packet, and the interface is configured to send the first packet. Alternatively, this may also be understood as the logic circuit is configured to obtain a first packet, and send the first packet by using the interface.

In some other embodiments in this disclosure, the logic circuit and the interface may be configured to perform functions or operations or the like performed when the foregoing communication apparatus is used as an intermediate node. For example, the interface is configured to obtain a first packet, and the logic circuit is configured to schedule the first packet to a corresponding queue based on the first packet. Optionally, the interface may be further configured to forward the first packet based on the first packet.

In still some other embodiments in this disclosure, the logic circuit and the interface may be configured to perform functions or operations or the like performed when the foregoing communication apparatus is used as a receive end. For example, the interface is configured to obtain the first packet, and the logic circuit is configured to determine an application process based on the first packet. The application process is used to process the first packet.

It may be understood that, for functions or operations or the like performed by the logic circuit and the interface, reference may be made to various embodiments shown in FIG. 9, the foregoing various illustrated embodiments, and the like. Details are not described herein again.

The logic circuit 1101 may be a chip, a processing circuit, an integrated circuit, a system on a chip (SoC) chip, or the like. The interface 1102 may be a communication interface, an input-output interface, or the like. In this embodiment of this disclosure, the logic circuit and the interface may also be coupled to each other. Specific connection manners of the logic circuit and the interface are not limit in this embodiment of this disclosure.

In this embodiment of this disclosure, when the communication apparatus is the circuit system shown in FIG. 11, the circuit system may be, for example, a circuit system in a network adapter. For example, the network adapter may be a device in a server. For another example, the network adapter may be a separate network adapter. For another example, the network adapter may be a network adapter integrated with a processor. For another example, the network adapter may be a network adapter encapsulated with a processor. A specific form of the network adapter is not limited in this embodiment of this disclosure. Alternatively, the circuit system may be a circuit system in a switch or the like. Details are not described in this embodiment of this disclosure.

FIG. 12 is a schematic diagram of a structure of a communication apparatus according to an embodiment of this disclosure. The communication apparatus may be configured to perform steps or functions or the like, performed by an intermediate node, in the foregoing embodiments. It may be understood that the intermediate node shown in FIG. 12, such as a switch, is a communication apparatus with a 10 G port used as an example. As shown in FIG. 12, the communication apparatus includes a 10 G port 1201 (only one is shown), an output port lookup 1203, an output queue 1204, and a 10 G port 1205 (only one is shown).

The 10 G port 1201 may be configured to input a first packet. The output port lookup 1203 is configured to determine a port and/or query a routing table and the like based on destination IP address information carried in a packet descriptor (such as the foregoing fixed-length descriptor). The output queue 1204 is configured to cache the first packet. The 10 G port 1205 is configured to output the first packet.

Optionally, when the communication apparatus has a plurality of 10 G ports, the communication apparatus may further include an input arbiter 1202. The input arbiter 1202 may be configured to determine to extract the first packet from the plurality of 10 G ports and the like. It may be understood that the input arbiter 1202 illustrated herein is merely an example, and shall not be construed as a limitation on this embodiment of this disclosure.

In this embodiment of this disclosure, the packet descriptor (fixed-length descriptor) is determined by using forwarding necessary information extracted from a link layer header of the first packet. Functions of the modules shown in FIG. 12 are merely examples. In specific implementation, each module may have another function. Details are not described herein.

It may be understood that the communication apparatus shown in FIG. 12 is merely an example, and in specific implementation, the communication apparatus may have another division method or the like, which is not limited in this embodiment of this disclosure.

For specific description of the communication apparatus shown in FIG. 9 to FIG. 12, reference may also be made to the foregoing method embodiments. Details are not described herein again.

In addition, an embodiment of this disclosure further provides a computer program, and the computer program is configured to implement operations and/or processing, performed by a transmit end, of the method for processing a packet provided in this disclosure.

An embodiment of this disclosure further provides a computer program, and the computer program is configured to implement operations and/or processing, performed by a receive end, of the method for processing a packet provided in this disclosure.

An embodiment of this disclosure further provides a computer program, and the computer program is configured to implement operations and/or processing, performed by an intermediate node, of the method for processing a packet provided in this disclosure.

An embodiment of this disclosure further provides a computer-readable storage medium. The computer-readable storage medium stores computer code, and when the computer code is run on a computer, the computer is enabled to perform operations and/or processing, performed by a transmit end, of the method for processing a packet provided in this disclosure.

An embodiment of this disclosure further provides a computer-readable storage medium. The computer-readable storage medium stores computer code, and when the computer code is run on a computer, the computer is enabled to perform operations and/or processing, performed by a receive end, of the method for processing a packet provided in this disclosure.

An embodiment of this disclosure further provides a computer-readable storage medium. The computer-readable storage medium stores computer code, and when the computer code is run on a computer, the computer is enabled to perform operations and/or processing, performed by an intermediate node, of the method for processing a packet provided in this disclosure.

An embodiment of this disclosure further provides a computer program product. The computer program product includes computer code or a computer program, and when the computer code or the computer program is run on a computer, operations and/or processing, performed by a transmit end, of the method for processing a packet provided in this disclosure is performed.

An embodiment of this disclosure further provides a computer program product. The computer program product includes computer code or a computer program, and when the computer code or the computer program is run on a computer, operations and/or processing, performed by a receive end, of the method for processing a packet provided in this disclosure is performed.

An embodiment of this disclosure further provides a computer program product. The computer program product includes computer code or a computer program, and when the computer code or the computer program is run on a computer, operations and/or processing, performed by an intermediate node, of the method for processing a packet provided in this disclosure is performed.

An embodiment of this disclosure further provides a communication system. The communication system includes a transmit end and a receive end. The transmit end may be configured to perform step 201 and step 202 (step of sending) shown in FIG. 2. The receive end may be configured to perform the step of receiving the first packet and step 205 shown in FIG. 2 and the like. Alternatively, the transmit end may be further configured to perform the method shown in FIG. 6, and the receive end may be further configured to perform the method shown in FIG. 7. Optionally, the communication system may further include an intermediate node, and the intermediate node may be configured to perform step 203 and step 204 shown in FIG. 2. Alternatively, the intermediate node may be further configured to perform the method shown in FIG. 8.

It may be understood that, for specific implementations of the transmit end, the receive end, and the intermediate node, reference may be made to the various embodiments shown above. Details are not described herein again.

In several embodiments provided in this disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the technical effects of the solutions provided in embodiments of this disclosure.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this application. Therefore, the protection scope of this application shall be subject to the protection scope of the claims.

What is claimed is:

1. A method implemented by a communication apparatus, the method comprising:

obtaining a second packet comprising at least one of a network layer header or a transport layer header;

generating, based on the second packet, a first packet comprising a first-layer header, wherein the first-layer header comprises an identification field for identifying whether the first-layer header comprises information in a second-layer header, wherein a link layer header of the first packet comprises the information in the at least one of the network layer header or the transport layer header of the second packet, and wherein the first packet does not comprise the at least one of the network layer header or the transport layer header; and processing the first packet.

2. The method of claim 1, wherein the first packet does not comprise the second-layer header.

3. The method of claim 1, wherein the first-layer header and the second-layer header comprise at least one of the link layer header, a network layer header, or a transport layer header, and wherein the second-layer header is different from the first-layer header.

4. The method of claim 3, wherein a link layer protocol of the link layer header comprises any one of an Ethernet protocol, a wireless fidelity (Wi-Fi) protocol, or a point-to-point protocol (PPP), wherein a network layer protocol of the network layer header comprises any one of an Internet Protocol (IP) version 4 (IPv4) or IP version 6 (IPv6), an Address Resolution Protocol (ARP), or a multi-protocol label switching (MPLS) protocol, and wherein a transport layer protocol of the transport layer header comprises any one of a Transmission Control Protocol (TCP), a User Datagram Protocol (UDP), a generic routing encapsulation (GRE) protocol, a Datagram Congestion Control Protocol (DCCP), or a Stream Control Transmission Protocol (STCP).

5. The method of claim 1, further comprising:

determining that the first-layer header comprises the information in the second-layer header when the identification field carries a first identifier; or determining that the first-layer header does not comprise the information in the second-layer header when the identification field carries a second identifier.

6. The method of claim 5, further comprising determining that the first-layer header comprises the information in the second-layer header in response to the identification field carrying the first identifier, wherein the first-layer header comprises the link layer header, wherein the link layer header comprises at least one of source Internet Protocol (IP) address information, destination IP address information, or source port information, wherein the second-layer header comprises at least one of a network layer header or a transport layer header, wherein the source IP address information and the destination IP address information are from the network layer header, and wherein the source port information is from the transport layer header.

7. The method of claim 6, wherein the link layer header further comprises type of service (TOS) information from the network layer header.

8. The method of claim 1, wherein processing the first packet comprises sending the first packet.

9. The method of claim 1, wherein a payload of the first packet is the payload of the second packet.

10. The method of claim 1, wherein the first packet is generated based on the second packet in response to a determining that a length of the second packet is less than or equal to at least one of a length threshold or a destination port field in the transport layer header of the second packet carries a preset port identifier.

11. The method of claim 1, wherein processing the first packet comprises at least one of:

forwarding the first packet based on a destination Internet Protocol (IP) address information comprised in the link layer header; or scheduling the first packet to a corresponding queue based on a type of service (TOS) information comprised in the link layer header.

12. The method of claim 11, wherein when a queue depth of the corresponding queue is greater than or equal to a depth threshold, the TOS information comprises marked explicit congestion notification (ECN) information.

13. The method of claim 1, wherein processing the first packet comprises:

determining an application process based on source Internet Protocol (IP) address information, destination IP address information, and source port information in the link layer header; and processing the first packet using the application process.

14. An apparatus comprising:

a memory configured to store instructions; and a processor coupled to the memory and configured to execute the instructions to cause the apparatus to:

obtain a second packet comprising at least one of a network layer header or a transport layer header;

generate, based on the second packet, a first packet comprising a first-layer header, wherein the first-layer header comprises an identification field for identifying whether the first-layer header of the first packet comprises information in a second-layer header, wherein a link layer header of the first packet comprises the information in the at least one of the network layer header or the transport layer header of the second packet, and wherein the first packet does not comprise the at least one of the network layer header or the transport layer header; and process the first packet.

15. The apparatus of claim 14, wherein the processor is further configured to execute the instructions to cause the apparatus to:

determine that the first-layer header comprises the information in the second-layer header in response to the identification field carrying a first identifier, wherein the first-layer header is the link layer header, wherein the link layer header comprises at least one of a source IP address information or a destination IP address information from a network layer header, or a source port information from a transport layer header.

16. The apparatus of claim 14, wherein the processor is further configured to execute the instructions to cause the apparatus to perform at least one of:

forwarding, using a transceiver, the first packet based on a destination IP address information comprised in the link layer header; or scheduling the first packet to a corresponding queue based on a type of service (TOS) information comprised in the link layer header.

17. The apparatus of claim 14, wherein the processor is further configured to execute the instructions to cause the apparatus to:

determine an application process based on a source IP address information, a destination IP address information, and a source port information in the first-layer header; and process the first packet using the application process.

18. A computer program product comprising computer-executable instructions stored on a non-transitory computer-readable storage medium, the computer-executable instructions when executed by a processor of an apparatus, cause the apparatus to:

obtain a second packet comprising at least one of a network layer header or a transport layer header;

generate, based on the second packet, a first packet comprising a first-layer header, wherein the first-layer header comprises an identification field for identifying whether the first-layer header of the first packet comprises information in a second-layer header, wherein a link layer header of the first packet comprises the information in the at least one of the network layer header or the transport layer header of the second packet, and wherein the first packet does not comprise the at least one of the network layer header or the transport layer header; and process the first packet.

19. The computer program product of claim 18, wherein the first-layer header and the second-layer header comprise at least one of the link layer header, a network layer header, or a transport layer header, and wherein the second-layer header is different from the first-layer header.

20. The computer program product of claim 19, wherein a link layer protocol of the link layer header comprises any one of an Ethernet protocol, a wireless fidelity (Wi-Fi) protocol, or a point-to-point protocol (PPP), wherein a network layer protocol of the network layer header comprises any one of an Internet Protocol (IP) version 4 (IPv4) or IP version 6 (IPv6), an Address Resolution Protocol (ARP), or a multi-protocol label switching (MPLS) protocol, and wherein a transport layer protocol of the transport layer header comprises any one of a Transmission Control Protocol (TCP), a User Datagram Protocol (UDP), a generic routing encapsulation (GRE) protocol, a Datagram Congestion Control Protocol (DCCP), or a Stream Control Transmission Protocol (STCP).

* * * * *